United States Patent
Fukuda

(10) Patent No.: US 6,594,740 B1
(45) Date of Patent: Jul. 15, 2003

(54) RECORDING/REPRODUCING DEVICE AND RECORDING/REPRODUCING METHOD

(75) Inventor: Shinichi Fukuda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/403,050

(22) PCT Filed: Feb. 24, 1999

(86) PCT No.: PCT/JP99/00839

§ 371 (c)(1),
(2), (4) Date: Jan. 24, 2000

(87) PCT Pub. No.: WO99/44202

PCT Pub. Date: Sep. 2, 1999

(30) Foreign Application Priority Data

Feb. 26, 1998  (JP) .......................................... 10-044989

(51) Int. Cl.[7] .............................................. G06F 12/00
(52) U.S. Cl. ........................ 711/156; 711/163; 369/47.1
(58) Field of Search ............................. 711/4, 154, 156, 711/159, 161, 163, 164; 369/47.1

(56) References Cited

U.S. PATENT DOCUMENTS 5,959,945 A  *  9/1999  Kleiman ..................... 340/5.74

FOREIGN PATENT DOCUMENTS

JP  01-296363  * 11/1988

OTHER PUBLICATIONS

Symantec, "The Norton Desktop for Windows", 1992, Symentec.*
Ron Person, Karen Rose, Using Windows 95, 1993.*
Halladay et al., Using PC Tools for Windows, 1993.*

* cited by examiner

Primary Examiner—Matthew Kim
Assistant Examiner—Woo H. Choi
(74) Attorney, Agent, or Firm—Jay H. Maioli

(57) ABSTRACT

Index data is automatically formed with respect to music data recorded on a recording medium. In the index data, statuses showing states of the music data such as reproducible data, data which was moved to another recording medium and whose reproduction is inhibited, and deleted data are provided for each music data. The status is changed in association with a change in state of the music data. For example, when the music data which was moved to another recording medium and whose reproduction is inhibited is returned from a move destination, the status is changed so as to indicate a reproducible state. Index data which does not exist on the recording medium can be formed in the outside and newly added. Information of the music data possessed by the user can be managed in a lump by using the index data.

14 Claims, 15 Drawing Sheets

Fig. 10

EXISTING INDEX FILE

| | State | Musician | Music name | AlbumName | Music-No. | Date | Who |
|---|---|---|---|---|---|---|---|
| A → | mvo | namie amuro | don't wanna cry | 19blues | paopci516818 | 1997/12/24 | f038264 |
| B → | norm | eagles | lie's eyes | eagles best | agxhm.358616 | 1996/01/23 | cd |
| C → | norm | eagles | new kid in town | net | sjgcv683848 | 1996/04/28 | net |
| D → | norm | masayoshi takanaka | ready to fly | din | sdygiug64684 | 1997/12/12 | din |
| E → | dlt | eagles | hotel california | hotel carifornia | ywonc103468 | 1995/01/23 | cd |

Fig. 12

| State | Musician | Music name | AlbumName | Music-No. | Date | Who |
|---|---|---|---|---|---|---|
| mvo | namie amuro | don't wanna cry | 19blues | paopci516818 | 1997/12/24 | f038264 |
| norm | eagles | hotel california | hotel carifornia | ywonc103468 | 1995/01/23 | cd |
| norm | eagles | lie's eyes | eagles best | agxhm.358616 | 1996/01/23 | cd |
| norm | eagles | new kid in town | net | sjgcv683848 | 1996/04/28 | net |
| norm | masayoshi takanaka | ready to fly | din | sdygiug64684 | 1997/12/12 | din |

| State | Musician | Music name | AlbumName | Music-No. | Date | Who |
|---|---|---|---|---|---|---|
| mvo | namie amuro | don't wanna cry | 19blues | paopci516818 | 1997/12/24 | f038264 |
| norm | eagles | lie's eyes | eagles best | agxhm.358616 | 1996/01/23 | cd |
| norm | eagles | new kid in town | net | sjgcv683848 | 1996/04/28 | net |
| norm | john lennon | imagine | imagine | sygarhlf06884 | 1998/01/29 | cd |
| norm | masayoshi takanaka | ready to fly | din | sdygiug64684 | 1997/12/12 | din |
| dlt | eagles | hotel california | hotel carifornia | ywonc103468 | 1995/01/23 | cd |

| State | Musician | Music name | AlbumName | Music-No. | Date | Who |
|---|---|---|---|---|---|---|
| mvo | namie amuro | don't wanna cry | 19blues | paopci516818 | 1997/12/24 | f038264 |
| mvo | masayoshi takanaka | ready to fly | din | sdygiug64684 | 1997/12/12 | din |
| norm | eagles | lie's eyes | eagles best | agxhm.358616 | 1996/01/23 | cd |
| norm | eagles | new kid in town | net | sjgcv683848 | 1996/04/28 | net |
| dlt | eagles | hotel california | hotel carifornia | ywonc103468 | 1995/01/23 | cd |

| State | Musician | Music name | AlbumName | Music-No. | Date | Who |
|---|---|---|---|---|---|---|
| norm | eagles | lie's eyes | eagles best | agxhm.358616 | 1996/01/23 | cd |
| norm | eagles | new kid in town | net | sjgcv683848 | 1996/04/28 | net |
| norm | masayoshi takanaka | ready to fly | din | sdygiug64684 | 1997/12/12 | din |
| norm | namie amuro | don't wanna cry | 19blues | paopci516818 | 1997/12/24 | f038264 |
| dlt | eagles | hotel california | hotel carifornia | ywonc103468 | 1995/01/23 | cd |

A

RECORDING/REPRODUCING DEVICE AND RECORDING/REPRODUCING METHOD

TECHNICAL FIELD

The invention relates to a recording and reproducing apparatus and a recording and reproducing method for accumulating a number of music data and holding attribute information of the respective accumulated music data.

BACKGROUND ART

Hitherto, what is called a CD changer in which a number of CDs (Compact Discs) are enclosed and the CDs are automatically reproduced has been put into practical use. In the CD changer, tens to hundreds of CDs are enclosed in one box and the CD selected by a predetermined operation is picked up and reproduced. The CD can be reproduced every CD or a plurality of CDs are selected and can be reproduced at random on a disc unit basis or on a unit basis of a music piece recorded on the CD. The CD changer is mainly installed in a home and used.

In the above CD changer, however, since exchange time of CDs is caused, there is a problem that it is difficult to realize a continuous reproduction without interrupting a signal reproduced from the CD the halfway. The CD changer enclosing 100 or 200 CDs has problems such that its box is large and the apparatus itself is heavy and it is very inconvenient when the apparatus is carried and installed.

For example, therefore, an apparatus such that music data recorded on CDs is accumulated into a recording medium such as a hard disk has been proposed. For example, such an apparatus is called a music server and by compression encoding the music data by a predetermined method, the music data of, for example, about 1000 music pieces can be accumulated onto a hard disk having a-memory capacity of a few G (Giga) bytes.

In the music server, the attribute information regarding the respective accumulated music data, for example, information such as music piece title and name of musician can be recorded. The attribute information is recorded automatically or by a user operation in correspondence to the inputted music data. The recorded attribute information is displayed, for example, as a list by a display unit provided for the music server when retrieving the music data stored in the server. On the basis of the attribute information displayed on the display unit, the user can retrieve or select a desired one of the music data accumulated in the music server and reproduce the desired music data of the user. It is very convenient for the user because the desired music data can be retrieved by operating a predetermined key or the like on the basis of the contents displayed on the display unit.

The unnecessary music data is deleted, namely, erased from the recording medium of the server. In this instance, the user can select either a method of deleting the unnecessary music data from the recording medium so that it can never be reproduced therefrom or a method of disabling the unnecessary music data to be temporarily reproduced by saving it into another area or the like. The temporarily saved data can be recovered by a predetermined method and reproduced again.

The user often possesses music data of an amount exceeding an amount of data which can be accumulated in the music server. Similarly, there can be a situation such that although the data was once accumulated in the music server, it is deleted later. The music data other than that accumulated in the music server is managed perfectly independent of the music server. There is, consequently, a problem that even if the user owns the music server, the data other than the music data owned by the user cannot be managed by one server and it is difficult to effectively use the server.

DISCLOSURE OF INVENTION

It is, therefore, an object of the invention to provide a recording and reproducing apparatus and a recording and reproducing method for storing attribute information with respect to not only music data which is accumulated onto a recording medium and can be reproduced but also data which has already been accumulated.

To solve the above problems, according to the invention, there is provided a recording and reproducing apparatus comprising: memory means for storing supplied data and attribute data of the supplied data; a recording and reproducing unit for writing the supplied data into a storing unit and reading out and reproducing the data written in the memory means; and control means for allowing the attribute data of the data shifted into an unreproducible state where the reproduction by the recording and reproducing unit is impossible in the data stored in the memory means to be stored into the memory means.

According to the invention, there is provided a recording and reproducing apparatus comprising: memory means for storing supplied data and attribute data including status data indicative of a status of the supplied data; a recording and reproducing unit for writing the supplied data into the memory means and reading out and reproducing the data written in the memory means; and control means for controlling the operation of the recording and reproducing unit on the basis of the status data stored in the memory means.

According to the invention, there is provided a recording and reproducing apparatus comprising: memory means for storing supplied data and attribute data of the supplied data; a recording and reproducing unit for writing the supplied data into the memory means and reading out and reproducing the data written in the memory means; and control means for controlling the operation of the recording and reproducing unit on the basis of the attribute data stored in the memory means and collating with the data stored in the memory means on the basis of at least the attribute data of the supplied data when the supplied data is newly written.

According to the invention, there is provided a recording and reproducing method of a recording and reproducing apparatus having a storing unit in which supplied data and attribute data of the supplied data are written, comprising the steps of: collating with the data stored in the storing unit on the basis of at least the attribute data of the supplied data when the writing of the supplied data into the storing unit is selected; controlling the writing operation of the supplied data into the storing unit on the basis of a collation result; and rewriting the attribute data of the data read out from the storing unit when the data stored in the storing unit is read out from the storing unit and supplied to another equipment and stored therein.

As mentioned above, according to the invention, the supplied data and the attribute data of the supplied data are stored into the memory means. By the recording and reproducing unit, the supplied data is written into the memory means and the data written in the memory means is read out and reproduced. The attribute data of the data shifted to an unreproducible state where the reproduction by the recording and reproducing unit is impossible in the data stored in the memory means is stored into the memory means by the control means. Therefore, the data shifted to the unreproducible state where the reproduction by the recording and reproducing unit is impossible in the data stored in the memory means can be known by the attribute data of the data.

According to the invention, the supplied data and the attribute data including the status data showing the status of the supplied data are stored in the memory means. The supplied data is written into the memory means and the data written in the memory means is read out and reproduced by the recording and reproducing unit. The operation of the recording and reproducing unit is controlled by the control means on the basis of the status data stored in the memory means.

According to the invention, the supplied data and the attribute data of the supplied data are stored into the memory means. The supplied data is written into the memory means and the data written in the memory means is read out and reproduced by the recording and reproducing unit. By the control means, the operation of the recording and reproducing unit is controlled on the basis of the attribute data stored in the memory means and, when the supplied data is newly written, it is collated with the data stored in the memory means on the basis of at least the attribute data of the supplied data.

According to the invention, there is provided a recording and reproducing method of a recording and reproducing apparatus having a storing unit in which supplied data and attribute data of the supplied data are written, comprising the steps of: collating with the data stored in the storing unit on the basis of at least the attribute data of the supplied data when the writing of supplied data into a storing unit is selected; controlling the writing operation of the supplied data into the storing unit on the basis of a collation result; and rewriting the attribute data of the data read out from the storing unit when the data stored in the storing unit is read out from the storing unit and supplied to another equipment and stored therein.

BRIEF DESCRIPTION OF DRAWINGS

FIG. 10 is a schematic diagram showing an example of a display of index data which is displayed in a display unit;

FIG. 12 is a schematic diagram showing an example of a display of the index data which is displayed in the display unit;

FIG. 13 is a schematic diagram showing an example of a display of index data which is displayed in the display unit;

FIG. 14 is a schematic diagram showing an example of a display of index data which is displayed in the display unit; and FIG. 15 is a schematic diagram showing an example of a display of index data which is displayed in the display unit.

BEST MODE FOR CARRYING OUT THE INVENTION

Figure 1:
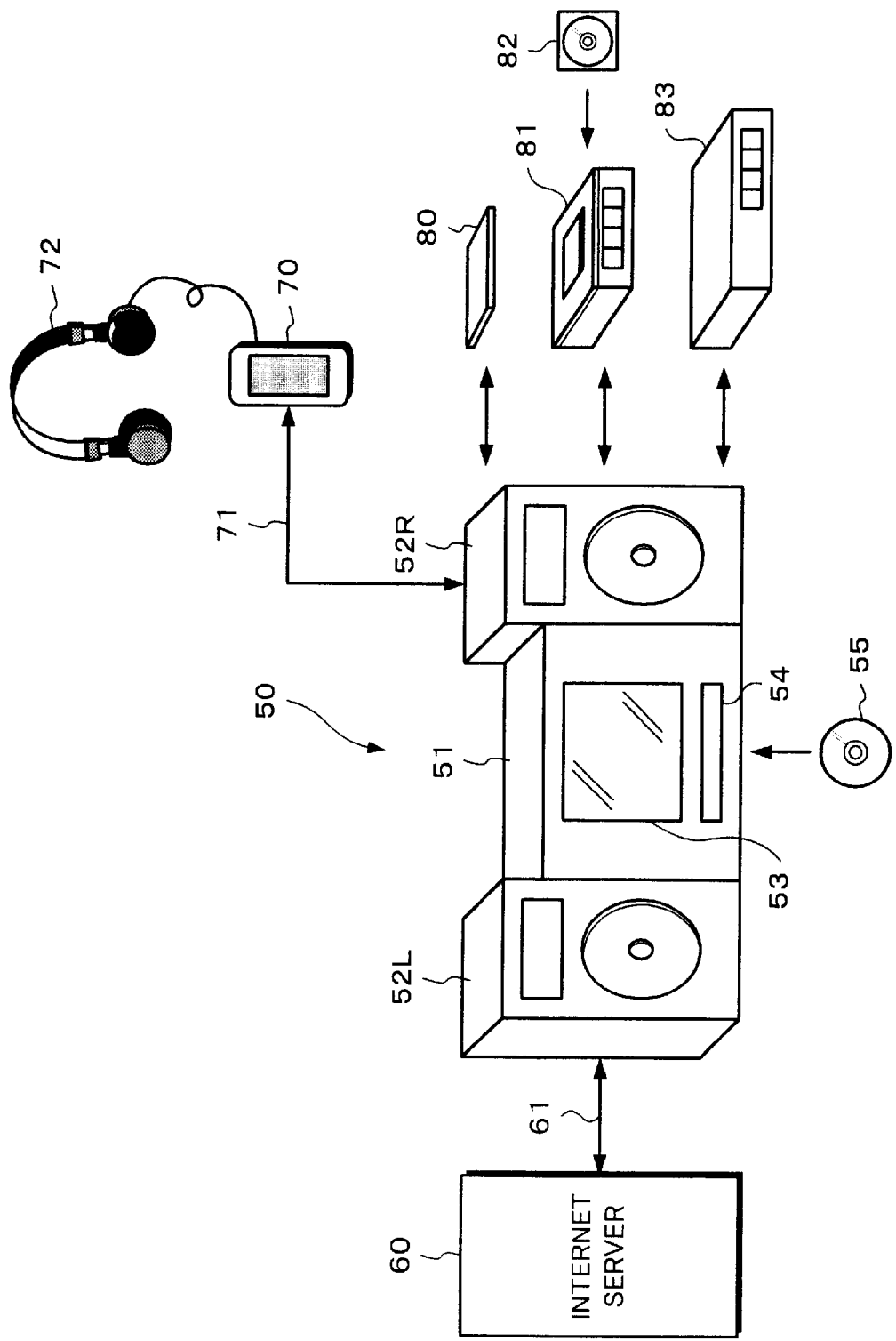
FIG. 1 is a schematic diagram schematically showing a music server according to the invention and a system using the music server.

The best mode for carrying out the invention will now be described hereinbelow with reference to the drawings. FIG. 1 schematically shows a music server to which the invention is applied and a system using the music server. A music server 50 comprises a server main body 51 and right and left speaker units 52R and 52L. The server main body 51 has a display unit 53 constructed by, for example, an LCD (Liquid Crystal Display) panel and a CD inserting portion 54 to insert a CD into the server main body 51.

Although not shown in FIG. 1, an operation unit comprising a plurality of operating switches to operate functions of the server main body 51 by the user is provided for the server main body 51. A signal receiving unit to receive, for example, an infrared signal for remote controlling the functions of the server main body 51 by a remote commander can be provided. As will be explained hereinlater, the server main body 51 has a controller. Various operations of the server main body 51 are controlled by the controller on the basis of predetermined programs which are previously stored in, for example, an ROM.

The user loads a CD 55 into the server main body 51 through the CD inserting portion 54 and performs a predetermined operation by using the operation unit (not shown), thereby reproducing the CD 55. A reproduction signal reproduced from the CD 55 is generated from the speaker units 52L and 52R, so that the user can enjoy music recorded on the CD 55. If the CD 55 includes text data such as titles of music pieces and the like, the titles of music pieces and the like are displayed in the display unit 53 on the basis of the text data.

The music server 50 has therein a recording medium of a large capacity such as a hard disk. When the user performs a predetermined operation by using the operation unit (not shown), the reproduction data reproduced from the CD 55 loaded in the server main body 51 from the CD inserting portion 54 can be recorded onto the recording medium comprising the hard disk. In this instance, either a method of recording at the same transfer speed as a normal reproducing speed of the CD 55 or a high speed recording method of recording at a transfer speed higher than the normal reproducing speed of the CD 55 can be selected. When recording at the high transfer speed, by performing an accounting process by a predetermined procedure, data regarding the selection of the CD or the selection of the music piece recorded on the CD and the reproduction data as music data reproduced from the CD can be recorded at a transfer speed higher than that of the data reproduced at the normal reproducing speed of the CD.

In the music server 50, the music data reproduced from the CD 55 is compression encoded by a predetermined method such as ATRAC mentioned above and recorded as compression music data. The music data of about 1000 music pieces can be stored onto a hard disk having a capacity of, for example, 6 GBytes. A list of the music pieces stored on the hard disk is displayed in, for example, the display unit 53. On the basis of the music piece title list displayed in the display unit 53, the user can select and reproduce an arbitrary one of the music pieces stored on the hard disk. As for the hard disk, since the random access can be performed, a number of music data stored can be read out by an arbitrary order and continuously reproduced.

Although various methods of compression encoding can be used, in the embodiment, a method called ATRAC2 (Adaptive Transform Acoustic Coding 2) as disclosed in, for example, U.S. Pat. No. 5,717,821 is used. According to the compression coding method disclosed in U.S. Pat. No. 5,717,821, the masking effect based on the auditory nature and the frequency dependency of the minimum audible limit are used and the audio data is compression encoded by using both the conversion coding and the entropy coding. The encoding/decoding can be performed at a high speed while maintaining a high sound quality by hardware of a relatively small scale.

The music server 50 can be connected to an external system, for instance, an Internet server 60 as a server connected to the Internet via, for instance, a communication line 61 as a public telephone line. By connecting from the music server 50 to the Internet server 60 via the communication line 61, various information existing on the Internet can be obtained. The Internet server 60 has a database of, for example, title information or the like of commercially available music CDs. A user peculiar key to use the database is allocated to the user. When the database is used, authentication is performed on the basis of the user peculiar key. After completion of the user authentication, the data associated to the CD, for example, title information of the CD is transmitted to the user, so that the user can obtain the data associated to the CD.

The accounting process to the music server 50 is also performed in the Internet server 60 in accordance with services which are supplied to the user. In case of performing the high speed recording of the CD 55 mentioned above, the music server 50 communicates data indicative of the execution of the high speed recording to the Internet server 60, so that the accounting process to the user who performs the high speed recording is performed, the CD and music piece can be selected and the high speed recording can be executed.

Although the accounting process is performed here by the Internet server 60 having a lot of additional information of CDs, the invention is not limited to the above example. For instance, the foregoing accounting process can be performed by another server connected to the Internet. The foregoing accounting process can be also executed by, for instance, a dedicated network different from the Internet.

A portable recording and reproducing apparatus 70 has a memory medium comprising a hard disk or a flash memory. Another memory medium or recording medium can be used so long as it can follow the reproducing speed of music. By connecting the portable recording and reproducing apparatus 70 to the music server 50 by a connecting line 71, the music data recorded in the music server 50 can be transferred to the portable recording and reproducing apparatus 70 and recorded to the memory medium of the portable recording and reproducing apparatus 70. At this time, on the music server 50 side, although the music data transferred to the apparatus 70 exists on the memory medium such as hard disk or flash memory, it is set into an unreproducible state where it cannot be reproduced. The memory medium or recording medium which is used in the portable recording and reproducing apparatus 70 has a capacity of, for example, about 200 MBytes and can store the music data of tens of music pieces. In the following description, the memory device or memory medium comprising a semiconductor memory such as a flash memory and the recording medium such as a disk-shaped recording medium such as a hard disk are generally called memory media.

The above transfer method which is used in the invention, namely, the operation such that when the music data is transferred, the music data is recorded onto a memory medium on the transfer destination side and, on a memory medium on the transfer source side, the transferred music data is set into the unreproducible state although it exists on the memory medium is called "move". By moving the music data as mentioned above, the unlimited copy of the music data can be prevented.

Although the music server 50 and portable recording and reproducing apparatus 70 are connected by the connecting line 71 in the above embodiment, the invention is not limited to this example. For instance, mutually corresponding attaching portions are provided for the music server 50 and portable recording and reproducing apparatus 70 and the portable recording and reproducing apparatus 70 is directly attached to the music server 50, thereby enabling data to be transmitted and received between the server 50 and apparatus 70. Besides the electrical connection, for example, an interface corresponding to IrDA (Infrared Data Association) to transmit and receive data by an infrared signal is provided for both the server 50 and apparatus 70 and the music data can be transferred between the server 50 and apparatus 70 by the infrared signal.

Further, by providing a predetermined interface for the music server 50, information can be exchanged to various media. For example, by providing an interface corresponding to a PC card 80 for the server 50, music data which is distributed by the PC card 80 can be installed into the music server 50 or data can be transmitted and received between a personal computer and the music server 50. By providing a serial digital interface by an optical cable or the like for the server 50, music data can be transmitted and received to/from another digital music data recording and reproducing apparatus such as a disc recorder 81 using a small magnetooptic disk having a diameter of, for example, about 64 mm. In the embodiment, a disc cartridge 82 enclosing therein the foregoing small magnetooptic disk is loaded into the disc recorder 81. The music data reproduced from the magnetooptic disk of the disc cartridge 82 is supplied to the music server 50. Similarly, an interface such as IEEE1394 is provided for the server 50, thereby also enabling a set top box 83 for a CATV (Cable Television), a satellite broadcasting, or the like to be connected.

The PC card is a standard of card type peripheral equipment for a personal computer according to the common enactment of PCMCIA (Personal Memory Card International Association) of U.S.A. and JEIDA (Japan Electronics Industry Development Association) of Japan. IEEE1394 is an interface standard selected by Electric Electronics Engineers Association of U.S.A..

The music server 50 can have the WWW (World Wide Web) browser as a built-in application. By connecting to the Internet server 60 through the communication line 61, various contents described by, for example, HTML (Hypertext Markup Language) existing on the Internet can be retrieved and displayed on the display unit 53.

With such a construction, for example, the user can reproduce the music data stored in the music server 50 and listen to it by the speaker units 52L and 52R, load the CD 55 into the server 50 through the CD inserting portion 54, and reproduce the CD 55.

By communicating between the music server 50 and Internet server 60, the title information or the like of the CD 55 loaded into the server 50 through the CD inserting portion 54 can be automatically obtained from the server 60 via the communication line 61. The information obtained from the server 60 is stored into the music server 50 and the stored title information is displayed in the display unit 53 of the server 50 if necessary. More specifically speaking, user peculiar information (hereinafter, referred to as user information) such as user ID data of the server 50 is sent from the music server 50 to the Internet server 60. On the Internet server 60 side, the collating process or accounting process is performed on the basis of the received user information. The media information of the CD which is necessary for the user or the CD which is being reproduced is sent from the music server 50 to the Internet server 60. In the Internet server 60, on the basis of the received media information, additional information to the music data, for example, additional information such as titles of the music pieces, names of musicians, names of composers and songwriters, words, and jacket images is retrieved. In the Internet server 60, predetermined information regarding the CD requested from the user is returned to the music server 50.

For example, TOC (Table of Contents) information of the CD 55 is sent as media information to the Internet server 60. A database which enables the additional information for the music data to be retrieved is constructed in the Internet server 60 on the basis of the TOC information. The additional information can be obtained by retrieving another WWW server on the Internet. The Internet server 60 retrieves the additional information of the music data by using the received TOC information as media information. The additional information can be retrieved, for example, on the basis of time information (included in the TOC information) of each of the music pieces recorded on the CD 55.

The additional information obtained by retrieving is transmitted from the Internet server 60 to the music server 50. In the music server 50, the received additional information is displayed in the display unit 53 and is written into, for example, the hard disk drive together with the TOC information of the CD 55 by a CPU 8, which will be explained herein later. By inserting the retrieved additional information into an HTML file and sending the resultant file from the server 60, the additional information can be displayed in the music server 50 by the built-in WWW browser software.

If another URL (Uniform Resource Locator) on the Internet has been described in the additional information, in the music server 50, it is possible to access to a homepage or the like which is shown by such another URL and exists on the Internet.

Further, by communicating data between the Internet server 60 and server 50, the music data of the CD 55 loaded into the server 50 via the CD inserting portion 54 can be recorded onto the memory medium of the music server 50 at a speed higher than the normal reproducing speed specified in the CD 55, for example, the music data of one CD 55 can be recorded for about two minutes. When no communication is performed between the. Internet server 60 and server 50, the music data is recorded onto the memory medium of the server 50 at a speed equal to the normal reproducing speed specified in the CD 55, namely, at a one-time speed.

By connecting to the portable recording and reproducing apparatus 70 by the connecting line 71, the server 50 can transfer and move the music data stored in the music server 50 to the portable recording and reproducing apparatus 70. Even in a state where the server 50 and apparatus 70 are not connected by the connecting line 71, the moved music data can be reproduced by the portable recording and reproducing apparatus 70 or can be listened to by, for example, headphones 72. The transferred and moved music data is set into the unreproducible state in the music server 50.

Figure 2:
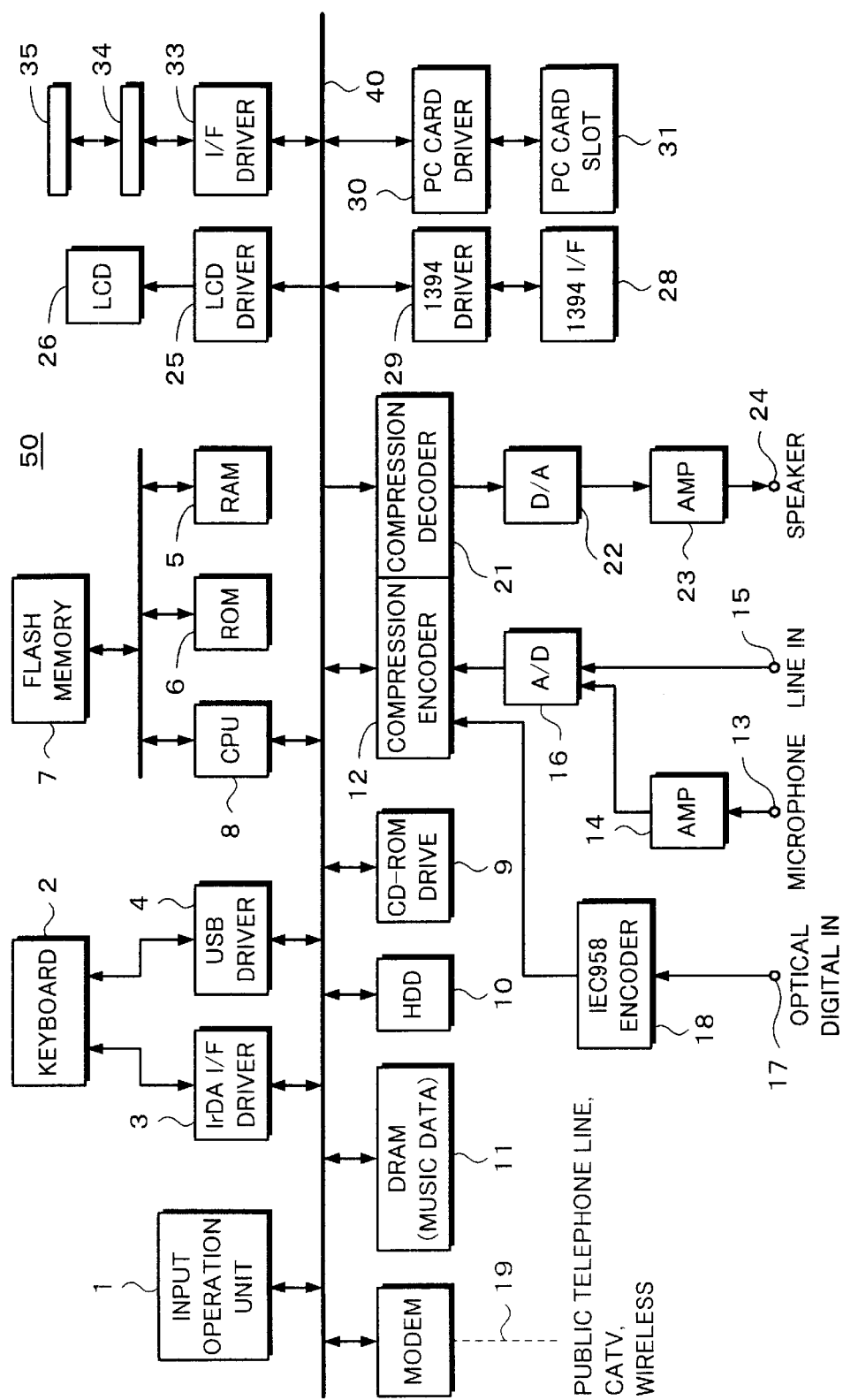
FIG. 2 is a block diagram showing an example of a construction of the music server.

FIG. 2 shows an example of a construction of the music server 50. First, in the music server 50, an RAM 5, an ROM 6, a flash memory 7, and the CPU 8 which are mutually connected by a bus are provided in a manner similar to the construction of the ordinary personal computer. The CPU 8 is connected to a bus 40. The CPU 8 is constructed by a microcomputer or the like and controls, as a controller, the whole operation of the music server 50.

Programs to control the operation of the music server 50 are previously been stored in the ROM 6. In the music server 50, the CPU 8 allows the operation corresponding to the operation of an input operation unit 1, which will be explained herein later, to be executed on the basis of the programs. A data area and a task area which are necessary to execute the programs are temporarily assured in the RAM 5 and flash memory 7. A program loader has been stored in the ROM 6 and the programs themselves can be loaded into the flash memory 7 by the program loader of the ROM 6.

The input operation unit 1 comprises, for example: a plurality of key operation keys of the push type and rotary type; and switches which are operated by the operation keys. The input operation unit 1 is not limited to it but an operation key of a rotary push type called a jog dial, a touch panel on an LCD, or the like can be used. A switching mechanism which responds by depressing can be used. A signal according to the operation of the input operation unit 1 is supplied to the CPU 8 via the bus 40. The CPU 8 generates a control signal to control the operation of the music server 50 on the basis of the signal from the input operation unit 1. The music server 50 is operated in accordance with the control signal generated by the CPU 8.

An infrared interface (IrDA I/F) driver 3 and/or a USB (Universal Serial Bus) driver 4 is connected to the bus 40. A keyboard 2 can be communicated or connected to the drivers 3 and 4. By using the keyboard 2, for example, music piece titles, names of artists, and the like corresponding to the music data which is recorded can be easily inputted. A data transfer can be performed via the infrared interface driver 3 or USB driver 4. The infrared interface driver 3 and USB driver 4 can be omitted. A CD-ROM drive 9 is connected to the bus 40. The CD 55 inserted from the disc inserting portion 54 as mentioned above is loaded into the CD-ROM drive 9. In the CD-ROM drive 9, the music data is read out from the set CD 55 at the specified normal reproducing speed. In the CD-ROM drive 9, the music data of the CD 55 can be read out at a speed higher than the specified normal reproducing speed, for example, at a speed that is 16 or 32 times as high as the specified normal reproducing speed.

The CD-ROM drive 9 is not limited to the foregoing example but can be constructed so as to cope with another disk-shaped recording medium such as magnetooptic disk or DVD (Digital Versatile Disc: tradename) on which music data has been stored. A drive corresponding to a memory card can be used. Further, the data which is read out from the CD-ROM drive 9 is not limited to the music data. Image data, text data, program data, or the like can be read out.

A hard disk drive (hereinafter, abbreviated to an HDD) 10 is connected to the bus 40. The music data read out from the CD-ROM drive 9 is recorded onto the HDD 10. As a pre-process which is executed before the music data is recorded onto the HDD 10, the music data read out by the CD-ROM drive 9 is supplied to a compression encoder 12 through the bus 40 and a DRAM 11 for audio.

In the compression encoder 12, a compression coding process of music data is performed by, for example, the compressing method disclosed in, for instance, U.S. Pat. No. 5,717,821 or the like. As for a compressing speed of music data by the compression encoder 12, two speeds of a high speed and a low speed are prepared on the basis of the control of the CPU 8. The low compressing speed corresponds to the normal reproducing speed specified in the CD 55 by the CD-ROM drive 9. The compressing speed is switched, for example, in accordance with the reproducing speed of the CD 55 by the CD-ROM drive 9. In the compression encoder 12, for example, an encoding algorithm according to the compressing speed is driven.

The changing method of the compressing speed in the compression encoder 12 is not limited to the above method. For instance, the compressing speed can be changed by switching a clock frequency of the compression encoder 12 or by preparing different hardware. Further, in the compression encoder 12 which can perform a high speed compression, it is also possible to cope with the low compressing speed by thinning out the processes.

The compression music data which was compression encoded by the compression encoder 12 is recorded and accumulated onto the HDD 10 via the DRAM 11.

Although the compression music data which was compression encoded by the compression encoder 12 is accumulated onto the HDD 10, the music data which is read out from the CD-ROM drive 9 can be directly supplied to the HDD 10 and recorded and accumulated to the hard disk of the HDD 10.

In the example, an audio signal which is inputted through an amplifier 14 from a microphone connected to a terminal 13 and an audio signal which is inputted from a line input terminal 15 are supplied to the compression encoder 12 via an A/D converter 16. The audio signals outputted from the A/D converter 16 can be compression encoded by the encoder 12 and supplied and recorded onto the HDD 10. Further, an optical digital signal is supplied from an optical digital input terminal 17 to the compression encoder 12 through an IEC958 (International Electrotechnical Commission 958) encoder 18. The audio signal supplied as an optical digital signal can be compression encoded by the encoder 12 and recorded onto the HDD 10.

Although the case where the compression encoder 12 uses the encoding algorithm as disclosed in, for example, U.S. Pat. No. 5,717,821 has been shown in the above embodiment, the invention is not limited to the foregoing example. That is, in the compression encoder 12, another algorithm can be used so long as it is an encoding algorithm by which information is compressed. For instance, the compression encoder 12 can use an encoding algorithm such as MPEG (moving picture experts group), PASC (precision adaptive sub-band coding), TwinVQ (tradename), RealAudio (tradename), or LiquidAudio (tradename).

A modem 20 is connected to the bus 40. For example, an external network 19 such as public telephone line, CATV, or wireless communication is connected to the modem 20. The music server 50 can perform a communication via the external network 19 by the modem 20.

The music server 50 is connected to, for instance, the Internet through the external network 19 and a communication is performed between the music server 50 and Internet server 60 at a remote place. A request signal and various information such as media information as information regarding the CD 55 loaded in the CD-ROM drive 9, user ID data and user information which have previously been allocated to the music server 50, and account information to the user are transmitted from the music server 50 to the Internet server 60.

The various information such as media information, user information, and the like is transmitted to the Internet server 60. In the server 60, the authentication of the user, the collating process, and the accounting process are executed on the basis of the received user information such as user ID data, the additional information of the music data is retrieved on the basis of the received media information, and the retrieved additional information is transmitted from the server 60 to the music server 50.

Although the example of returning the additional information of the music data has been shown here, the music data can be directly supplied from the external network 19 in response to a request of the user. That is, the user can download music data from the Internet server 60 by using the music server 50. The music data can be returned in correspondence to the media information. According to the above method, for example, a bonus track of the predetermined CD 55 can be obtained by distribution.

When the compression music data which was compression encoded by the compression encoder 12 and recorded and accumulated on the HDD 10 is read out from the hard disk of the HDD 10 for reproduction, it is supplied to a compression decoder 21 via the bus 40. The compression encoding of the compression music data read out from the hard disk of the HDD 10 is released by the compression decoder 21 and resultant data is outputted to a terminal 24 through a D/A converter 22 and an amplifier 23. The music data is supplied from the terminal 24 to the speakers 52L and 52R and music is reproduced. Although not shown in FIG. 2, as for a signal path starting from the D/A converter 22 and reaching the terminal 24 via the amplifier 23, two systems are provided in correspondence to stereophonic outputs. Similarly, as for the terminal 24, two terminals are provided in correspondence to stereophonic outputs.

In the compression decoder 21, a decoding algorithm corresponding to the encoding algorithm in the compression encoder 12 is used. The compression decoder 21 and compression encoder 12 can be realized by software processes which are executed by the CPU 8 without having hardware. A liquid crystal display device (hereinafter, abbreviated to an LCD) 26 constructing the display unit 53 is connected to the bus 40 through an LCD driving circuit 25. A drawing control signal is supplied from the CPU 8 to the LCD driving circuit 25 via the bus 40. The LCD 26 is driven by the LCD driving circuit 25 on the basis of the supplied drawing control signal and a predetermined display is performed on the display unit 53, namely, on the LCD 26.

For example, an operation menu of the music server 50 is displayed on the LCD 26. For example, a title list in the compression music data recorded and accumulated on the HDD 10 is displayed on the LCD 26. The title list is displayed on the LCD 26 on the basis of the data stored on the HDD 10 since the data obtained by decoding the additional information transmitted from the Internet server 60 has been supplied to the HDD 10. Further, for instance, a folder and a jacket image corresponding to the compression music data which is selected and reproduced are displayed on the LCD 26 on the basis of the additional information transmitted from the Internet server 60.

By operating a pointing device or keyboard 2 of the input operation unit 1 on the basis of the display on the LCD 26, the CPU 8 performs a reproduction control of the instructed music data. The erasure of the selected music data and the copy and move of the selected music data to external equipment can be controlled on the basis of the display on the LCD 26. For example, when the input operation unit 1 is the touch panel provided on the LCD 26, by touching the touch panel in accordance with the display on the LCD 26, the music server 50 can be operated. The music data recorded and accumulated on the HDD 10 is managed and controlled by the user by using the LCD 26 as an interface.

In the first embodiment, as an interface between the music server 50 and external general information equipment, it corresponds to IEEE1394 and the PC card. An IEEE1394 interface 28 is connected to the bus 40 via an IEEE1394 driver 29. A PC card slot 31 is similarly connected to the bus 40 via a PC card driver 30.

Data can be transmitted and received between the music server 50 and, for example, a personal computer by the IEEE1394 interface 28. Music data can be fetched by the IEEE1394 interface 28 from an IRD (Integrated Receiver/Decoder) for satellite broadcasting, a small magnetooptic disk or optical disk having a diameter of about 64 mm, a DVD, a digital video tape, or the like. By inserting a PC card into the PC card slot 31, it is possible to easily expand an external storage device or another media drive or various peripheral equipment such as modem, terminal adapter, capture board, and the like.

An interface 34 is an interface to transmit and receive music data or the like between the music server 50 and corresponding another recording and reproducing apparatus. For example, the portable recording and reproducing apparatus 70 shown in FIG. 1 mentioned above is applied to another recording and reproducing apparatus. The invention is not limited to it but another music server 50 can be used as another recording and reproducing apparatus.

The interface 34 is connected to the bus 40 via an interface driver 33. An interface 35 forming a pair together with the interface 34 is provided for another corresponding recording and reproducing apparatus. By electrically connecting the interfaces 34 and 35 by the predetermined connecting line 71, for example, the music data recorded and accumulated on the HDD 10 can be transferred from the music server 50 to another recording and reproducing apparatus.

Figure 3:
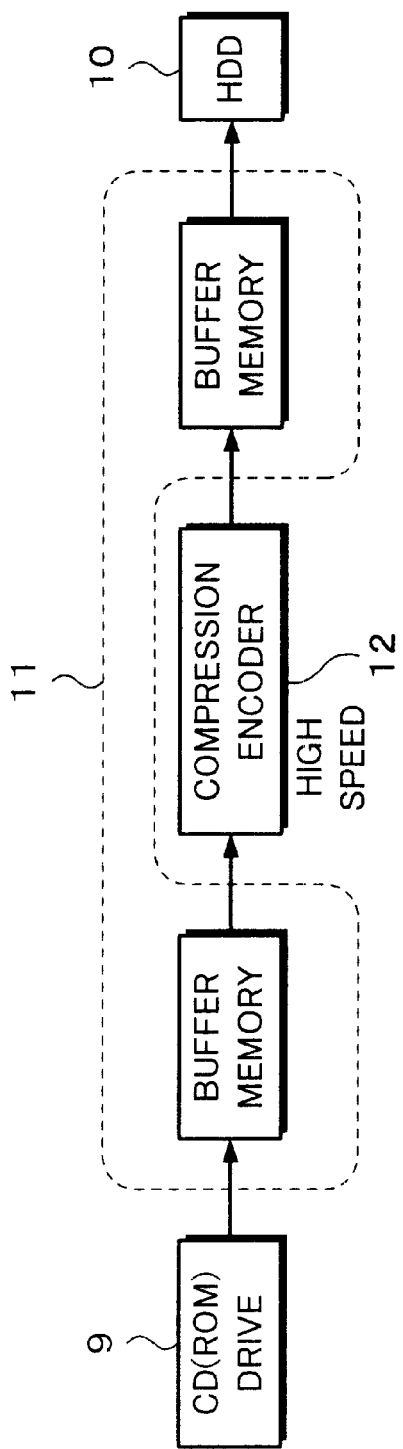
FIG. 3 is a diagram schematically showing a flow of a signal until music data read out by a CD-ROM drive is recorded to a hard disk drive.

FIG. 3 schematically shows a flow of the signal until the music data read out by the CD-ROM drive 9 is recorded onto the HDD 10. The music data read out from the CD-ROM drive 9 is once stored into the DRAM 11 as a buffer memory via the bus 40. The music data is read out from the DRAM 11 at a predetermined timing and supplied to the compression encoder 12 via the bus 40. As mentioned above, the compression encoder 12 is set to a predetermined compressing speed according to the reproducing speed of the CD-ROM drive 9. The music data is compression encoded by the compression encoder 12 and once stored again into the DRAM 11 as a buffer memory. The compression music data read out from the DRAM 11 at a predetermined timing is supplied to the HDD 10 via the bus 40 and recorded onto the hard disk of the HDD 10. In this instance, as mentioned above, the information of the CD 55 reproduced by the CD-ROM drive 9 is transmitted to the Internet server 60. The additional information of the CD 55 transmitted from the server 60 is also recorded onto the hard disk of the HDD 10 and managed as one data by the CPU 8 or the like together with the compression music data read out from the CD 55.

Figure 4:
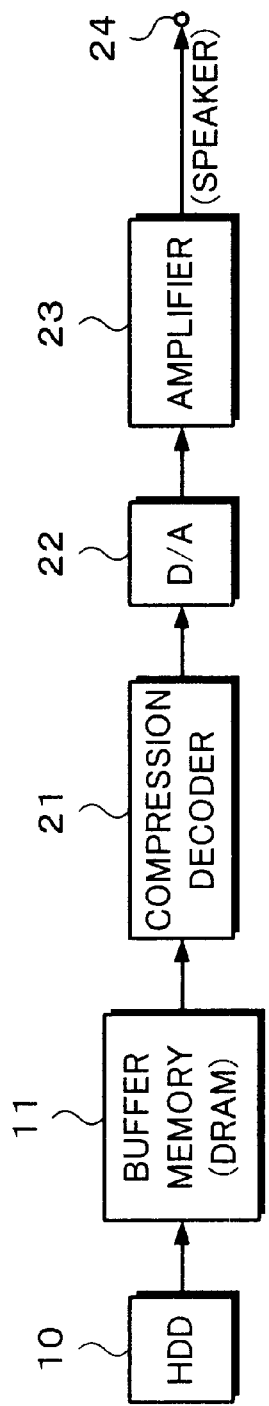
FIG. 4 is a diagram schematically showing a flow of a signal until the compression music data read out from the hard disk drive is reproduced and led to a terminal.

FIG. 4 schematically shows a flow of the signal until the compression music data read out from the HDD 10 is reproduced and led to the terminal 24. The compression music data read out from the HDD 10 is once stored into the DRAM 11 as a buffer memory via the bus 40. The compression music data is read out from the DRAM 11 at a predetermined timing and supplied to the compression decoder 21 via the bus 40. The compression encoding of the compression music data is released by performing a decompressing process in the compression decoder 21 and resultant data is supplied as music data to the D/A converter 22. The music data is converted into an analog audio signal by the D/A converter 22 and amplified by the amplifier 23 and led out as a reproduction output to the terminal 24. If a speaker is connected to the terminal 24, the user can enjoy the music reproduced by the speaker. In this instance, the additional information read out from the disk of the HDD 10 is decoded by the CPU 8 or the like if necessary and the music piece titles and the like are displayed on the display unit 53.

Figure 5:
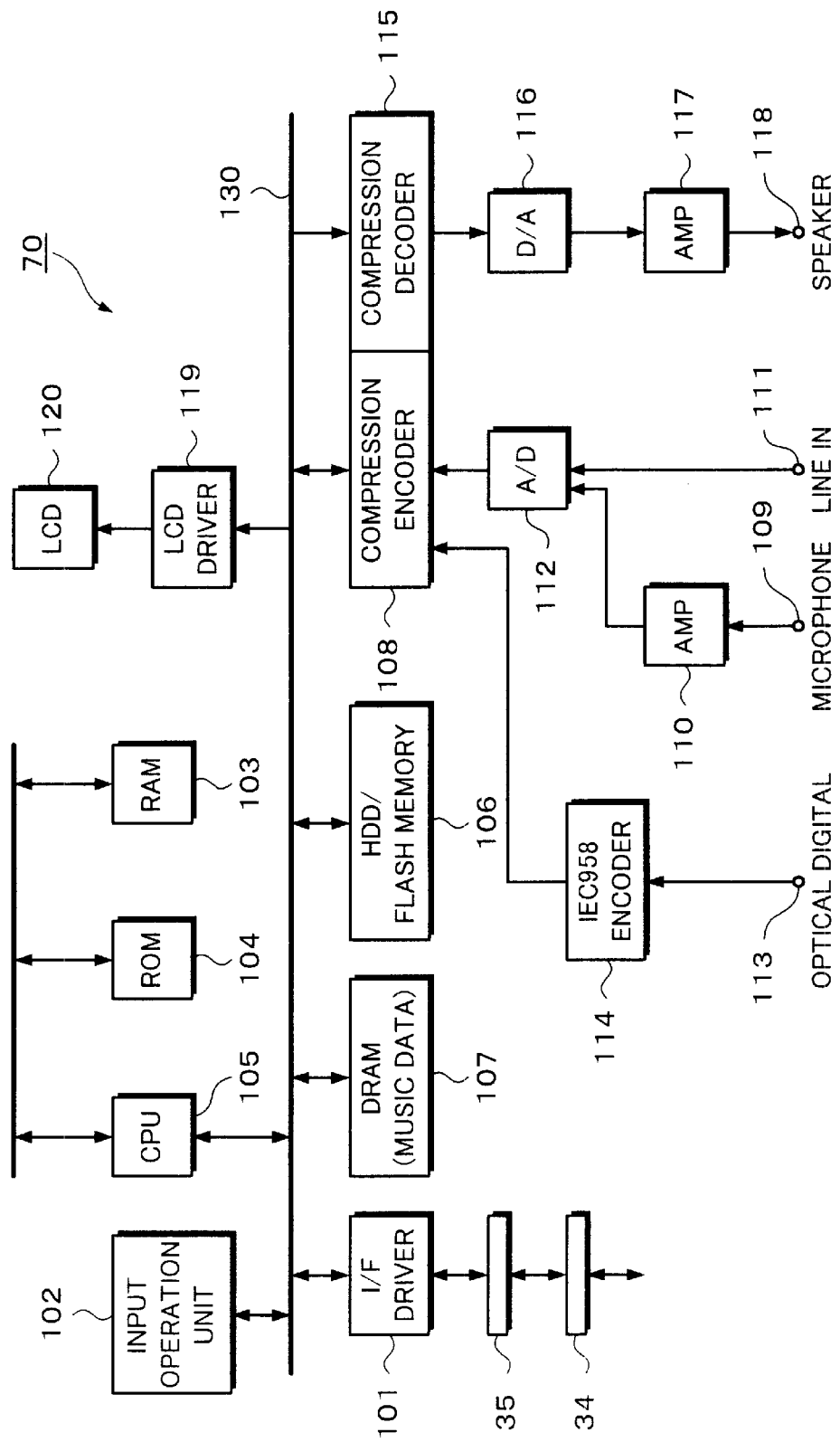
FIG. 5 is a block diagram showing an example of a construction of a portable recording and reproducing apparatus.

FIG. 5 shows an example of a construction of the portable recording and reproducing apparatus 70 which is used as another recording and reproducing apparatus. The portable recording and reproducing apparatus 70 has a construction similar to that of the music server 50 shown in FIG. 2 mentioned above. The portable recording and reproducing apparatus 70 is generally carried and used as a single unit by disconnecting the interface 34 on the music server 50 side and the interface 35 on the portable recording and reproducing apparatus 70 side. First, in the portable recording and reproducing apparatus 70, an RAM 103, an ROM 104, and a CPU 105 which are mutually connected by a bus are provided in a manner similar to the construction of the ordinary personal computer. A flash memory can be provided in a manner similar to the construction of the music server 50 mentioned above. The CPU 105 constructed by a microcomputer or the like is connected to a bus 130. The CPU 105 functions as a controller and the whole operation of the portable recording and reproducing apparatus 70 is controlled by the CPU 105.

Programs to control the operation of the portable recording and reproducing apparatus 70 have previously been stored in the ROM 104. In the portable recording and reproducing apparatus 70, the operation corresponding to the operation of an input operation unit 102, which will be explained herein later, is executed on the basis of the programs. A data area and a task area which are necessary to execute the programs are temporarily assured in the RAM 103.

The input operation unit 102 comprises, for example: a plurality of operation keys of the push type and rotary type; and a plurality of switches which are operated by the operation keys. The input operation unit 102 is not limited to it but an operation key of a rotary push type called a jog dial, a touch panel on an LCD provided for the apparatus 70, which will be explained herein later, or the like can be used. A mechanical switching mechanism which responds by depressing can be used. A signal according to the operation of the input operation unit 102 is supplied to the CPU 105 via the bus 130. The CPU 105 generates a control signal to control the operation of the portable recording and reproducing apparatus 70 on the basis of an output signal which is generated by operating the operation key of the input operation unit 102. The operation of the portable recording and reproducing apparatus 70 is switched and the operation is controlled in accordance with the control signal generated by the CPU 105.

In the music server 50, the music data which was read out from the HDD 10 and in which the transfer to the portable recording and reproducing apparatus 70 has been instructed is transferred or supplied to the portable recording and reproducing apparatus 70 via the interface 34, interface 35, and the connecting line connecting the interfaces 34 and 35. At the same time, the additional information of the music data whose transfer has been instructed is also transmitted to the apparatus 70 together with the transfer designated music data. In the case where mutually corresponding attaching portions are provided for the music server 50 and portable recording and reproducing apparatus 70, the interface 34 and interface 35 are directly connected and the music data is transferred between the server 50 and apparatus 70. Further, in the case where interfaces by IrDA are provided for both the apparatus 70 and server 50, the music data is transferred between the server 50 and apparatus 70 by an infrared signal.

The music data transferred and supplied from the server 50 to apparatus 70 is sent from an interface driver 101 to an HDD 106 as a music data recording medium of the portable recording and reproducing apparatus 70 via the bus 130 and recorded onto a hard disk of the HDD 106.

The music data recording medium of the portable recording and reproducing apparatus 70 is not limited to the HDD 106 but, for example, a flash memory can be used. Another recording medium such as a magnetooptic disk can be used as a recording medium of the music data so long as it can follow the reproducing speed of the music data. As a music data recording medium of the apparatus 70, by using a medium having a memory capacity of, for example, about 200 MBytes, tens of music pieces can be recorded. The music data transmitted from the server 50 and the additional information of the music data are also recorded to the disk of the HDD 106 of the apparatus 70.

In the embodiment, the music data which is transferred and recorded to the HDD 106 is the compression music data which has already been compression encoded in the music server 50. In the portable recording and reproducing apparatus 70, the music data is not limited to this example but music data which is not compression encoded can be supplied and recorded to the disk of the HDD 106. For example, the music data reproduced and read out from the CD 55 loaded in the CD-ROM drive 9 of the music server 50 is directly supplied to the portable recording and reproducing apparatus 70 via the interface driver 101. However, in case of directly supplying it to the apparatus 70, obviously, the number of recordable music data is remarkably limited.

As a pre-process which is executed before the music data is recorded to the disk of the HDD 106, the supplied music data is temporarily stored into a DRAM 107 for audio connected to the bus 130. The music data read out from the DRAM 107 is supplied to a compression encoder 108 via the bus 130. The compression encoder 108 performs a compression encoding process of the music data by an encoding algorithm similar to that of the compression encoder 12 in the music server 50. The compression music data which was compression encoded by the compression encoder 108 is supplied to the DRAM 107 and temporarily stored again into the DRAM 107. Finally, the compression music data stored in the DRAM 107 is read out and recorded onto the disk of the HDD 106.

As mentioned above, when the compression music data accumulated on the HDD 10 in the music server 50 is transmitted and transferred to the portable recording and reproducing apparatus 70 by instructing the move, the compression music data on the HDD 10 is set into the state where it cannot be read out and reproduced from the HDD 10 although it exists as data on the HDD 10. The compression music data moved to the apparatus 70 is returned again to the recording medium on the moving source side, namely, to the HDD 10 of the server 50, so that it can be read out and reproduced from the HDD 10 on the moving source side, namely, by the server 50. In this instance, the compression music data returned to the server 50 is deleted from the hard disk of the HDD 106 of the apparatus 70 as a recording medium on the move destination side.

In the embodiment, an audio signal which is inputted from a microphone connected to a terminal 109 via an amplifier 110 and an audio signal which is inputted from a line input terminal 111 are supplied to the compression encoder 108 through an A/D converter 112. In the compression encoder 108, a compression encoding process can be performed to the audio signal supplied from the A/D converter 112 and the encoded signal can be recorded onto the HDD 106. Further, an optical digital signal is supplied from an optical digital input terminal 113 to the compression encoder 108 through an IEC958 encoder 114. A compression encoding process can be performed to the audio signal supplied as an optical digital signal by the encoder 108 and the encoded signal can be recorded onto the disk of the HDD 106. If the apparatus 70 is a read only portable reproducing apparatus only for reproducing the compressed music data, all of the foregoing A/D converter 112, encoder 108, and the like can be omitted.

The compression music data is read out for reproduction from the HDD 106 and supplied to a compression decoder 115 through the bus 130. The music data whose compression encoding was released by performing the decompressing process to the supplied compression music data by the compression decoder 115 is outputted to a terminal 118 via a D/A converter 116 and an amplifier 117. For example, the headphones 72 are connected to the terminal 118. The user can listen to the reproduced music by wearing the headphones 72. Although not shown in FIG. 5, as for a signal path starting from the D/A converter 116 and reaching the terminal 118 via the amplifier 117, two systems are provided in correspondence to stereophonic outputs of the L-channel and R-channel. Similarly, as for the terminal 118, two terminals are provided in correspondence to stereophonic outputs of the L-channel and R-channel.

An LCD 120 is connected to the bus 130 via an LCD driving circuit 119. A drawing control signal is supplied from the CPU 105 to the LCD driving circuit 119 via the bus 130. The LCD 120 is driven on the basis of the supplied drawing control signal and a predetermined display is shown on the LCD 120. An operation menu of the portable recording and reproducing apparatus 70, a title list of the music data stored on the HDD 106, and the like are displayed on the LCD 120. For example, a folder and a jacket image corresponding to the music data which is selected and reproduced from the music data stored on the HDD 106 can be displayed on the LCD 120 on the basis of the additional information stored on the HDD 106.

By operating a pointing device of the input operation unit 102 on the basis of the display on the LCD 120, the user can select and reproduce one of the compression music data stored on the HDD 106. The erasure, copy, and move of the selected compression music data can be controlled on the basis of the display on the LCD 120. For example, by touching the touch panel of the input operation unit 102 in accordance with the display on the LCD 120, the user can input the operation of the portable recording and reproducing apparatus 70. As mentioned above, the management, recording, reproduction, and the like of the compression music data recorded on the HDD 106 are controlled by the user by using the LCD 120 as an interface.

Although not shown in FIG. 5, the portable recording and reproducing apparatus 70 is driven by a battery. For this purpose, a power source unit using a general secondary battery or a dry battery as a power supply source and a charging unit are provided for the apparatus 70. In the case where the music server 50 and portable recording and reproducing apparatus 70 are directly connected by the connecting line or attaching portions, an electric power is supplied from the music server 50 to the charging unit together with the transfer of the music data, thereby charging the secondary battery of the apparatus 70. The secondary battery of the apparatus 70 can be charged by an external charging power source. As a power supply source, only either the power source by the dry battery or the charging power source using the secondary battery can be used or provided in the apparatus 70.

Figure 6:
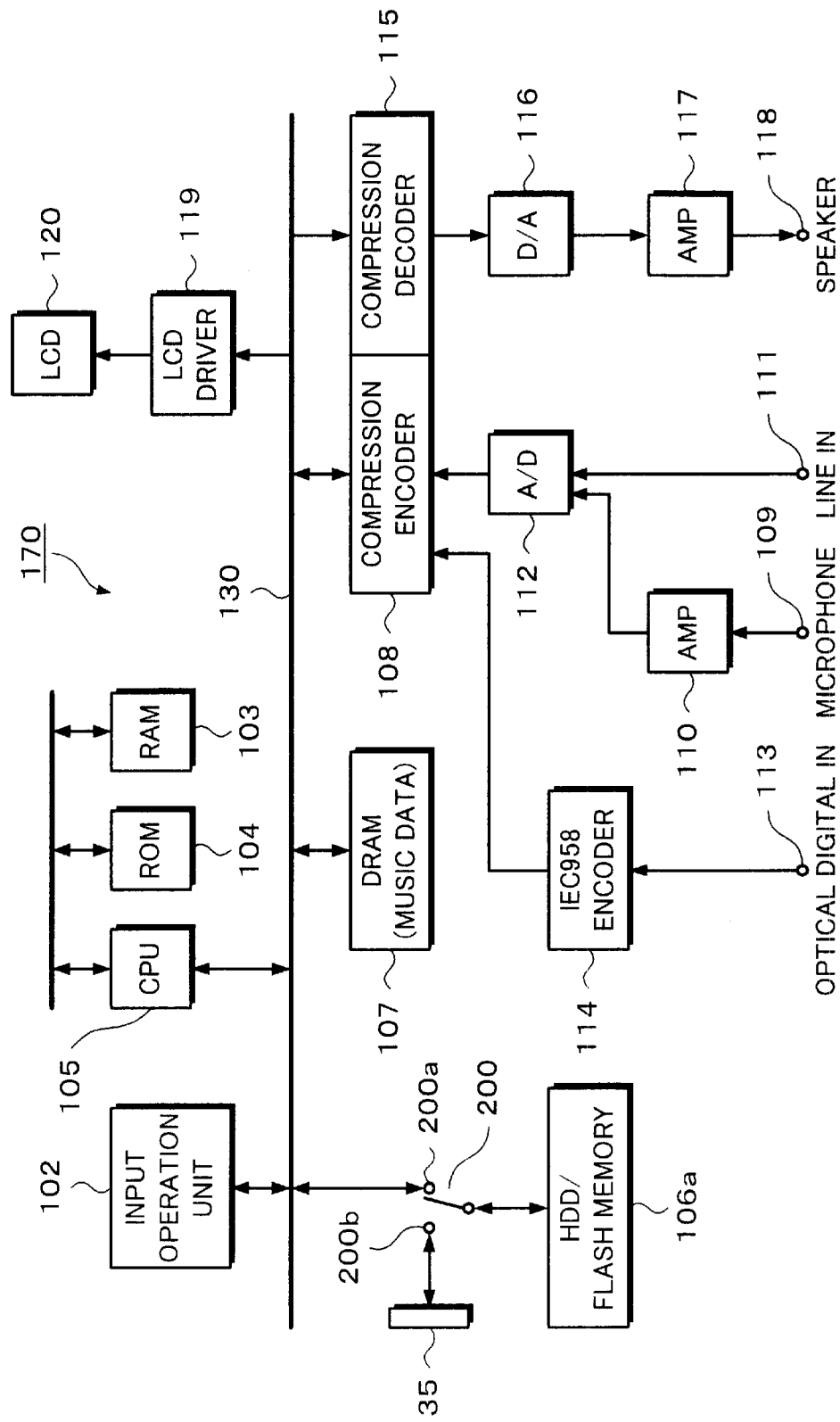
FIG. 6 is a block diagram showing another example of a portable recording and reproducing apparatus.

FIG. 6 shows another example of the portable recording and reproducing apparatus 70. In FIG. 6, portions common to those in FIG. 5 are designated by the same reference numerals and their detailed descriptions are omitted. According to a portable recording and reproducing apparatus 170 shown in FIG. 6, a switching circuit 200 is inserted between an HDD (or flash memory) 106a and the bus 130 besides the construction of FIG. 5 mentioned above. One selecting terminal 200a of the switching circuit 200 is connected to the bus 130 and another selecting terminal 200b is connected to the interface 35. The HDD 106a is disconnected from the bus 130 by the switching circuit 200.

When the compression music data is transferred from the music server 50, the terminal is switched to the selecting terminal 200b or the selecting terminal 200b is selected in the switching circuit 200. The HDD 106a and the bus 40 of the music server 50 are directly connected through the interfaces 34 and 35. When seen from the CPU 8 of the server 50, the HDD 106a seems as if it were a recording medium of the music server 50. The direct control of the HDD 106a is enabled by the CPU 8 of the music server 50. The move, copy, and the like of the compression music data can be easily performed between the music server 50 and portable recording and reproducing apparatus 170.

Figure 7:
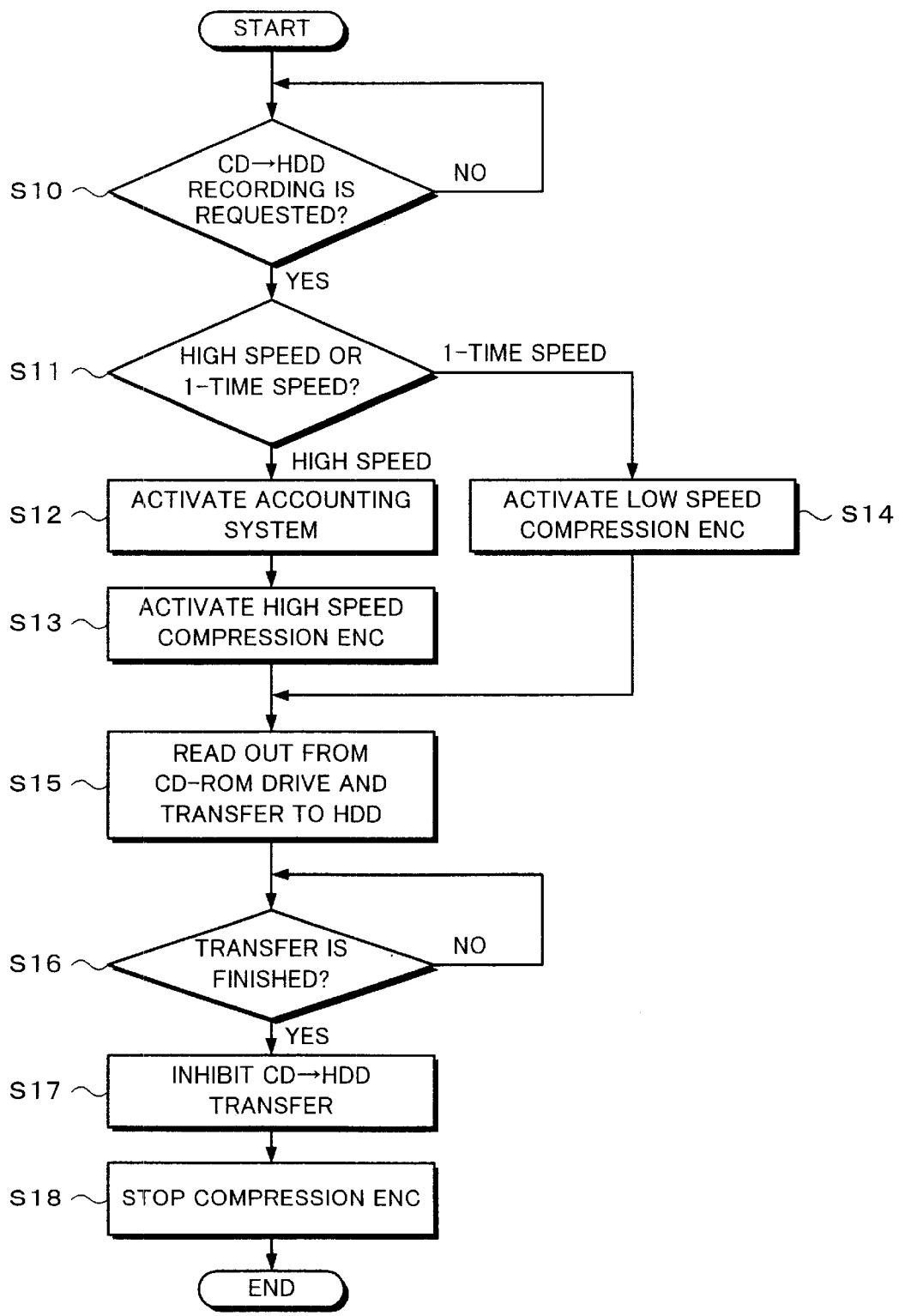
FIG. 7 is a flowchart of an example of processes when music data of CDs in the music server is recorded to the hard disk drive.

The operation of the system constructed as mentioned above will now be described. First, a function which is activated by only the music server 50 will be described. FIG. 7 is a flowchart of an example of processes when the music data of the CD 55 loaded in the CD-ROM drive 9 is recorded to the disk of the HDD 10 of the music server 50.

In first step S10, the apparatus waits for a request for recording the music data of the CD 55 onto the HDD 10 by the user. For example, when the recording request is inputted by the user by using the input operation unit 1, the processing routine advances to step S11. In step S11, a check is made to see if the recording requested by the user is "high speed recording" or "recording at a 1-time speed". For example, when the recording request is issued in step S10, a recording method, namely, whether the recording is performed at a high speed or a 1-time speed is designated by the user. The "recording at a 1-time speed" here denotes the operation to read out the CD 55 at the specified normal speed and record to the disk of the HDD 10. The "high speed recording" denotes the operation to read out the CD 55 at a speed higher than the speed that is two or more times as high as the normal speed specified in the CD 55 and record to the disk of the HDD 10.

If the execution of the "high speed recording" is designated in step S11, the processing routine advances to step S12 and accounting systems of the servers 50 and 60 are activated. Processes by the accounting systems of the servers 50 and 60 will be explained herein later. When the accounting process by the accounting system of the server 50 is performed and the high speed recording is permitted by another apparatus of the Internet server 60, step S13 follows. A high speed compressing process is activated in the compression encoder 12 and step S15 follows.

When the execution of the "recording at a 1-time speed" is designated in step S11, step S14 follows and a low speed compressing process is activated in the compression encoder 12. Step S15 follows. In step S15, the CD-ROM drive 9 is driven at a predetermined speed on the basis of the control of the CPU 8 and the music data recorded on the CD 55 loaded in the CD-ROM drive 9 is read out. The read-out music data is compression encoded by the compression encoder 12 and transferred and recorded onto the disk of the HDD 10.

When the transfer of the compression music data read out from the CD 55 to the HDD 10 is finished in step S16, the transfer of the data from the CD-ROM drive 9 to the HDD 10 is inhibited in next step S17. The compressing process of the compression encoder 12 is stopped in subsequent step S18.

Figure 8A:
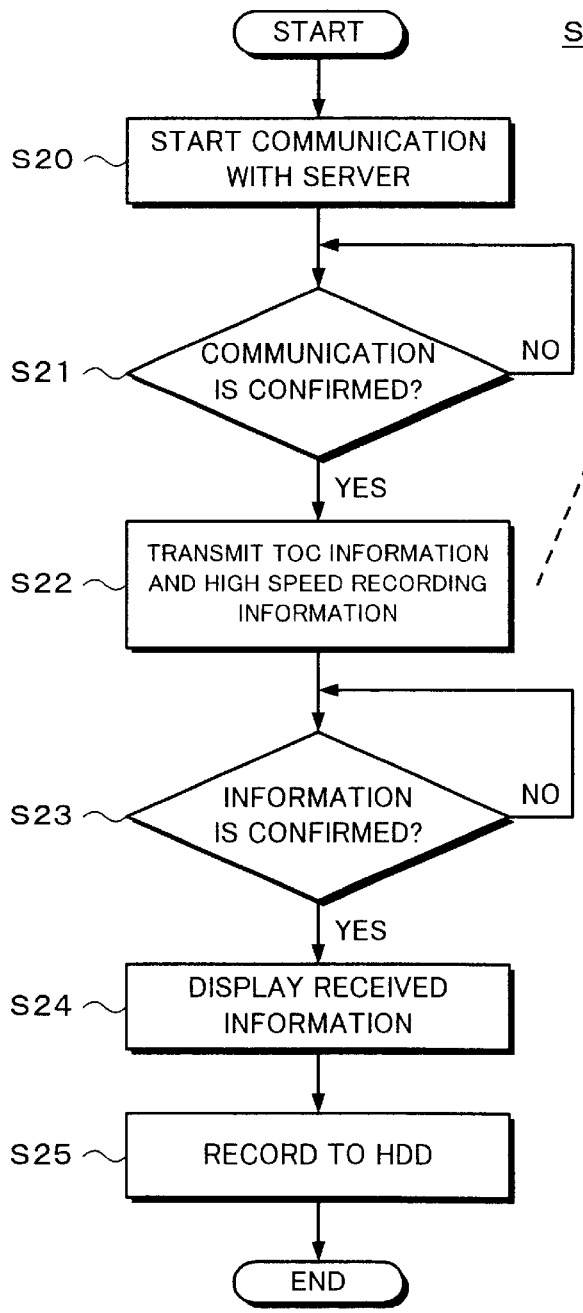
FIGS. 8A and 8B are flowcharts showing an example of accounting processes when the music data of a CD is recorded to the hard disk drive at a high speed.
Figure 8B:
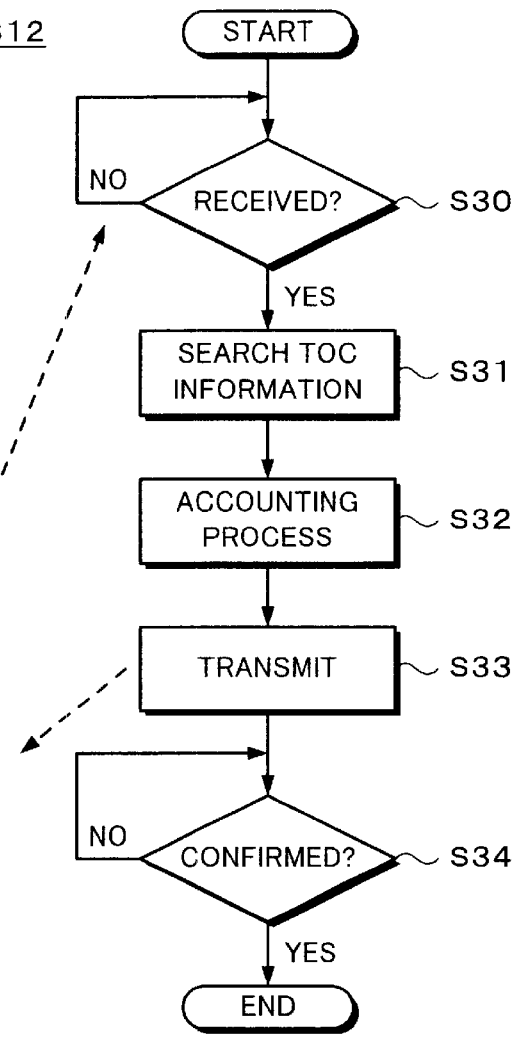

FIGS. 8A and 8B are flowcharts showing an example of the accounting processes of the accounting systems in step S12 in the flowchart of FIG. 7 mentioned above. The accounting process is performed by executing the data communication between the music server 50 and Internet server 60. FIG. 8A shows the accounting process in the accounting system in the music server 50. FIG. 8B shows the accounting process in the accounting system in the Internet server 60.

When the accounting process is started, the communication is first started between the music server 50 and Internet server 60 by a predetermined protocol in step S20 in FIG. 8A. When the connection between the server 50 and server 60 is made and it is confirmed that the communication can be performed between the servers 50 and 60 in step S21, the processing routine advances to step S22.

The TOC information of the CD 55 loaded in the CD-ROM drive 9, namely, the TOC information which is transferred and recorded to the HDD 10 is transmitted from the music server 50 to the Internet server 60 in step S22. The high speed recording information indicative of the execution of the high speed recording is sent from the music server 50 to the internet server 60 together with the TOC information of the CD 55. In FIG. 8B, in the Internet server 60, it is waited that the high speed recording information and the TOC information from the music server 50 are supplied or transmitted (step S30). When the high speed recording information and TOC information are received in the server 60, the transmitted TOC information is retrieved in step S31 on the basis of the transmitted TOC information by using the database in the server 60 or an external database. The CD 55 is specified by retrieving the information corresponding to the TOC information.

The accounting process is performed in next step S32. The sum to be charged is calculated on the basis of information of the number of music pieces which were recorded at a high speed and the like. The accounting process can be performed by, for example, debiting the sum directly from the user's bank account designated by the user on the basis of a preregistered credit card number of the user. The accounting method is not limited to it. For example, it is also possible to use a method whereby a function to read a prepaid card is provided in the music server 50, the set charge is sent to the music server 50, the charge is subtracted from the prepaid card, and the user pays it. The charge can be changed in accordance with the contents of the CD 55 or the recording of the music data read out from the CD 55 to the disk of the HDD 10 can be inhibited on the basis of the TOC information.

In step S33, the account information is sent to the music server 50. In FIG. 8A, the contents of the transmitted account information are confirmed (step S23). Whether the account information has been received by the music server 50 or not is also confirmed on the Internet server 60 side (step S34). For example, when it is confirmed on the music server 50 side that there is no error in the received account information and the account information was correctly received, data indicative of the completion of the confirmation is transmitted from the music server 50 to the server 60, thereby confirming the reception of the account information.

Returning to FIG. 8A, when the received account information is confirmed on the music server 50 side in step S23, the processing routine advances to step S24. The received account information and the like are displayed in the display unit 53. In step S25, the music data is read out by the CD-ROM drive 9 at a speed higher than the normal speed specified in the CD 55. The compressing process is performed at the high compressing speed in the compression encoder 12. The compression music data from the compression encoder 12 is supplied to the HDD 10 and recorded to the disk of the HDD 10. Step S25 corresponds to step S15 in FIG. 7.

Figure 9:
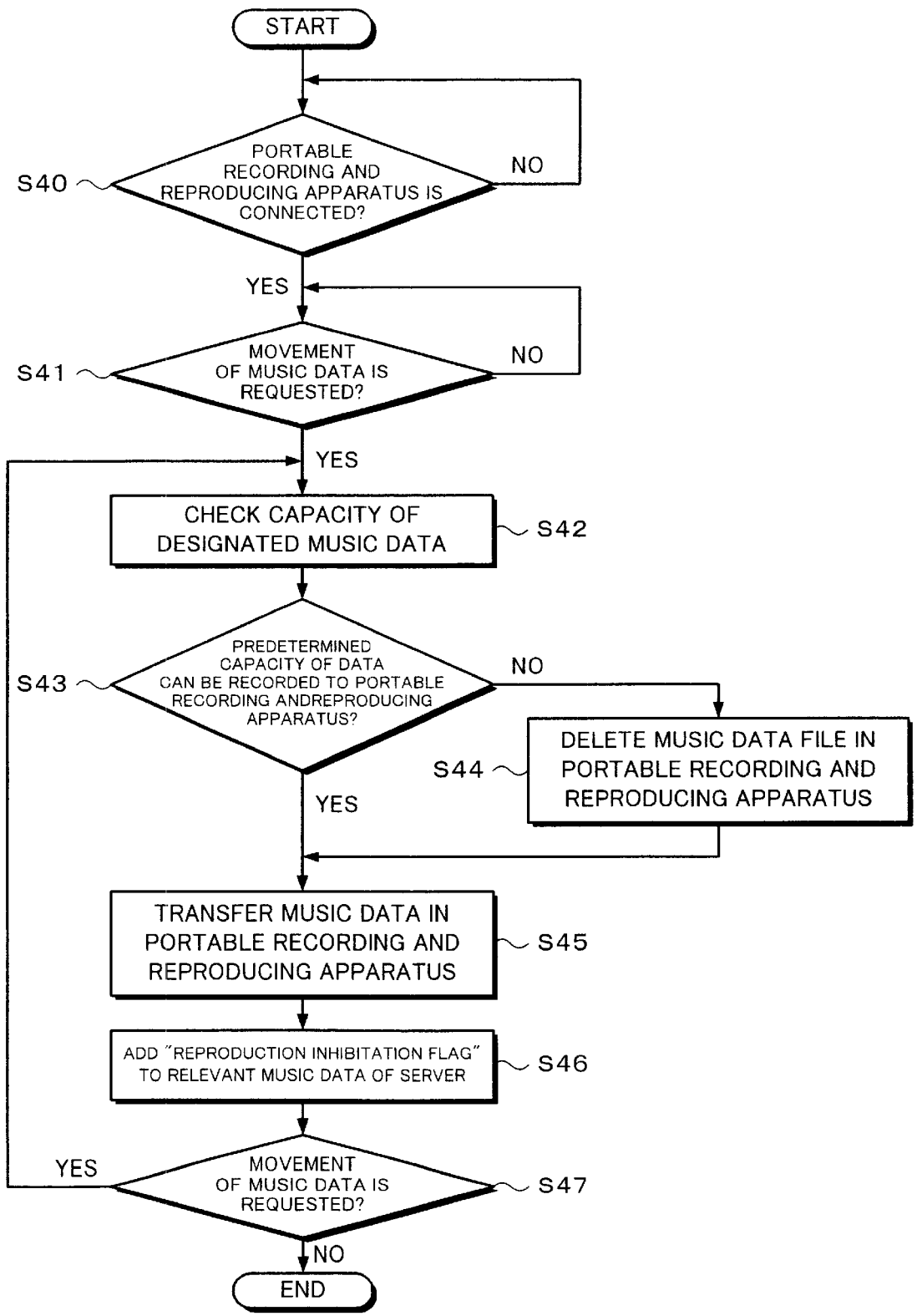
FIG. 9 is a flowchart of an example of a moving process of music data according to the invention.

In the embodiment, the interlocking operation can be realized between the music server 50 and portable recording and reproducing apparatus 70. For example, when the music data is moved from the music server 50 to the portable recording and reproducing apparatus 70, the interlocking operation is executed between the server 50 and apparatus 70. FIG. 9 shows a flowchart of an example of such move.

First, a check is made in step S40 to see if the music server 50 and portable recording and reproducing apparatus 70 have been connected by the interfaces 34 and 35. The connection between the server 50 and apparatus 70 is detected by, for example, transmitting and receiving predetermined signals between the interfaces 34 and 35. The detecting method of the connection between the server 50 and apparatus 70 is not limited to it. The connection between the server 50 and apparatus 70 can be detected by using a mechanical detecting mechanism by providing a switching mechanism to the portion connecting the music server 50 and portable recording and reproducing apparatus 70.

When the connection between the server 50 and apparatus 70 is confirmed in step S40, a check is made in next step S41 to see if the move of the music data recorded and accumulated on the HDD 10 to the portable recording and reproducing apparatus 70 has been requested. For example, the compression music data accumulated on the HDD 10 is displayed as a list of the information including the music piece titles in the display unit 53 and predetermined compression music data is selected by the user from the list displayed on the display unit 53 by a predetermined pointing device of the input operation unit 1. Further, an instruction of the move to the portable recording and reproducing apparatus 70 is inputted to the compression music data selected by the user from the input operation unit 1.

Various inputting methods of the moving instruction using the input operation unit 1 are considered. For example, a button to instruct the move is displayed in the display unit 53. By designating this button by using the pointing device of the input operation unit 1, the move is instructed. For example, the move can be instructed by what is called a drag & drop such that an icon is displayed in the display unit 53 every compression music data and the icon displayed in the display unit 53 is moved onto another icon which is displayed in the display unit 53 and shows the portable recording and reproducing apparatus 70 on the move destination side. The move can be instructed by operating the operating switch provided for the input operation unit 1.

When there is the moving request of the compression music data in step S41, a file size, namely, a data amount of the compression music data whose move was designated is examined by, for example, the CPU 8 on the server 50 side in step S42. A vacant capacity, namely, a recordable memory capacity of the HDD 106 is examined by, for example, the CPU 105 of the portable recording and reproducing apparatus 70 in next step S43. The vacant capacity of the HDD 106 and the file size (examined in step S42) of the compression music data whose move was designated are compared by, for example, the CPU 8 of the server 50. On the basis of a comparison result in step S42, a check is made by the CPU 8 to see if the compression music data whose move was designated can be recorded to the HDD 106. If the compression music data can be recorded to the HDD 106, the processing routine advances to step S45 and the transfer of the compression music data whose move was designated is started from the server 50 toward the apparatus 70.

If it is determined in step S43 that the vacant capacity on the HDD 106 of the portable recording and reproducing apparatus 70 is insufficient, step S44 follows. In step S44, the compression music data which has already been recorded on the HDD 106 is deleted automatically or on the basis of a procedure or method, which will be explained herein later, by the CPU 105 of the apparatus 70 so that the compression music data whose move was designated can be recorded to the HDD 106. The processing routine advances to step S45.

The deletion of the compression music data in step S44 is automatically performed under the control of the CPU 105 on the basis of a predetermined parameter of the compression music data which has already been recorded on the HDD 106. For example, in the portable recording and reproducing apparatus 70, there is considered a method whereby the number of reproducing times is counted every compression music data recorded on the HDD 106 and the compression music data is deleted from the HDD 106 in accordance with the order from the data in which the number of reproducing times is small. The compression music data recorded on the HDD 106 can be deleted in accordance with the order from the data in which the date when it was recorded on the HDD 106 is old.

When the compression music data is automatically deleted from the HDD 106 in step S44, there is a possibility that the compression music data that is important to the user is deleted from the HDD 106. To prevent it, it is possible to use the following method. That is, a warning such that a message showing that the apparatus is in the operating mode in which the compression music data is automatically deleted from the HDD 106 is displayed, a list of data to be deleted is displayed, or the like is displayed on the display unit 53 of the music server 50 or the LCD 120 of the portable recording and reproducing apparatus 70, and after a confirmation of the user was obtained, the compression music data can be deleted from the HDD 106. It is also possible to use a method whereby a list of the compression music data which has already been recorded on the HDD 106 is displayed on the display unit 53 of the music server 50 or the LCD 120 of the portable recording and reproducing apparatus 70 and the user himself selects the compression music data to be deleted.

By the processes in steps S43 and S44 mentioned above, when the apparatus is set into the state where the compression music data whose move was designated in the compression music data stored on the HDD 10 can be recorded to the HDD 106, the transmission, namely, transfer of the compression music data from the music server 50 to the portable recording and reproducing apparatus 70 is started in step S45. That is, the compression music data read out from the HDD 10 is supplied to the portable recording and reproducing apparatus 70 via the bus 40 and interface 34. In the portable recording and reproducing apparatus 70, the compression music data supplied via the interface 34 is recorded to the HDD 106 via the interface 35.

The transferred compression music data also exists on the HDD 10 on the music server 50 side in a manner similar to the case before it is transferred to the apparatus 70. In the embodiment, the reproduction of the relevant compression music data which has already been transferred to the apparatus 70, namely, which has been moved to the apparatus 70 and exists on the HDD 10 is inhibited (step S46). For example, a reproduction inhibition flag showing the inhibition of the reproduction is set for the compression music data on the HDD 10 at a point when the move to the apparatus 70 is completed. The reproduction of the compression music data moved to the apparatus 70 is inhibited by the CPU 8 of the server 50 by the reproduction inhibition flag, and the compression music data stored on the HDD 10 has virtually been moved from the music server 50 to the portable recording and reproducing apparatus 70. Therefore, it is managed such that as music data which can be reproduced by the server 50 or apparatus 70 among a plurality of compression music data, only one music data always exists, so that the illegal copy of the music data is prevented.

Whether there is the moving request of the next compression music data to the apparatus 70 or not is discriminated in step S47. If the user wants to move further another compression music data, the processing routine is returned to step S42. If there is not any more moving request of the music data, a series of moving processes of the music data is finished.

Although explanation has been made on the assumption that one of the plurality of compression music data stored on the HDD 10 is moved from the server 50 to the apparatus 70 in steps S42 to S46 in the flowchart of FIG. 9 mentioned above, the invention is not limited to such an example. A plurality of compression music data can be moved in a lump from the server 50 to the apparatus 70.

Although the embodiment has been described above on the assumption that, in the process in step S46, the reproduction of the moved compression music data is merely inhibited on the HDD 10 of the music server 50 as a moving source side and the compression music data itself exists, the invention is not limited to it. The moved compression music data can be deleted from the HDD 10, namely, the data itself can be erased.

Although the embodiment has been described with respect to the example in which the compression music data is moved from the music server 50 to the portable recording and reproducing apparatus 70, the move in the opposite direction is also possible. That is, the operation to move the compression music data recorded on the HDD 106 of the portable recording and reproducing apparatus 70 to the HDD 10 of the music server 50 can be executed in accordance with processes similar to those in the flowchart shown in FIG. 9.

In this instance, the compression music data moved from the music server 50 to the portable recording and reproducing apparatus 70 is moved again from the portable recording and reproducing apparatus 70 to the music server 50, thereby resetting the reproduction inhibition flag of the compression music data moved from the apparatus 70 among the plurality of compression music data stored on the HDD 10 in the music server 50. That is, by resetting the reproduction inhibition flag, the compression music data on the moving source side can be reproduced again in the music server 50. In this instance, as for the moved compression music data stored on the HDD 106 of the apparatus 70, the data itself is erased from the HDD 106 or the management data of the compression music data moved from the management table of the HDD 106 is deleted.

In the music server 50, a number of music data can be recorded onto the disk of the HDD 10. Therefore, index data of the music data is provided to rapidly search desired one of the plurality of music data stored on the HDD 10. The index data is updated when the music data of the CD 55 is recorded to the HDD 10, when music piece titles and the other data are inputted from another electronic equipment via the input operation unit 1 or a predetermined interface, when the music data is moved between the apparatus 70 and server 50, and the like. The updated index data is stored on, for example, the HDD 10.

FIG. 10 shows an example of a display of the index data which is displayed on the display unit 53. A data structure of the index data corresponds to that of the display of the index data shown in FIG. 10. It is not always necessary to make the order of data of the index display coincide with the order of the index data. In the example of the data of the index file shown in FIG. 10, one line corresponds to one music data and is constructed by attribute information of "State", "Musician", "Music Name", "Album Name", "Music-No.", "Date", and "Who".

"State" denotes a status and shows a status of the music data stored on the HDD 10. For example, if "State" is "mvo", this means that the music data has been moved to the apparatus 70. If "State" is "dlt", this means that the music data is the data deleted from the disk of the HDD 10. Further, if "State" is "norm", this means that the music data is in a state where it can be read out and reproduced from the disk of the HDD 10. The status is automatically updated by the CPU 8 in accordance with the state of each of the music data stored on the HDD 10, for example, in accordance with a status transition such as move or deletion.

"Musician" denotes a name of the musician or the like of the music data stored on the HDD 10. "Music Name" denotes a music piece title of the music data stored on the HDD 10. "Album Name" denotes a name allocated to the disc itself of the CD 55 in which the music data has been recorded. "Music-No." denotes a number allocated to the CD 55 for the purpose of, for instance, merchandize control. The data of "Musician", "Music Name", and the like is obtained from the Internet server 60 through, for example, the communication line 61 by the foregoing accounting process and automatically stored onto the disk of the HDD 10. The user can input them by using the input operation unit 1 or the like.

"Date" denotes a date when the music data was recorded to the HDD 10 of the music server 50. "Who" shows a supplying source of the music data. For example, "cd" indicates that the music data was supplied from the CD 55. A symbol starting from "f" denotes that the music data was supplied from another music server 50. "net" indicates data supplied through, for example, the communication line 61. "din" denotes data which was digitally inputted from, for instance, the terminal 17. The items of "Who", "Date", and the like are generated by the CPU 8 when the relevant music data was stored to the disk of the HDD 10, stored onto the disk of the HDD 10 in correspondence to the music data, and automatically updated in accordance with the foregoing status transition of the music data.

The index data is accessed from the index file if necessary by, for example, operating the input operation unit 1 by the user and displayed on the display unit 53 on the basis of the read-out file contents. The user can search the music data to be reproduced or moved and confirm the result of the operation performed by himself with reference to the information displayed on the display unit 53.

Figure 11:
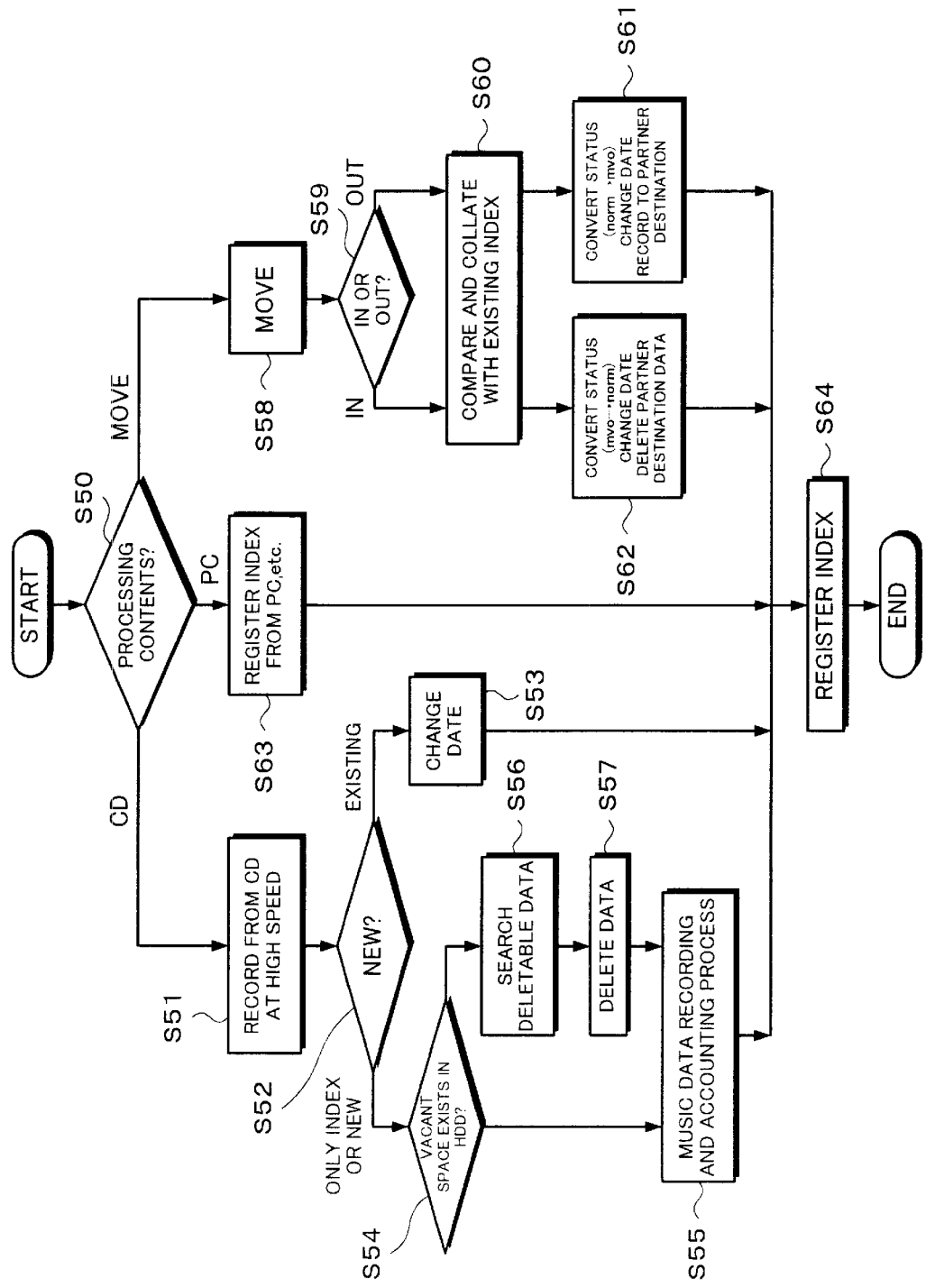
FIG. 11 is a flowchart of an example of a registering process of the index data according to the invention.

A registration of the indices and a display of the indices to the display unit 53 in association with the registration of the indices will now be described herein below. FIG. 11 is a flowchart of an example of the registering process of the index data. FIGS. 12 to 15 show examples of display of the index data to the display unit 53 in association with the registration of the index data in accordance with the operation contents.

In first step S50, the processing contents inputted from the input operation unit 1 by the user are discriminated. The following processes are automatically performed on the basis of the discrimination of the processing contents. In the example, any one of the recording of the music data from the CD 55 to the HDD 10, the move of the music data, and the registration of the index data from another electronic equipment such as a personal computer through a predetermined interface (for instance, the PC card slot 31 or the IEEE1394 interface 28) can be selected.

It is assumed that a plurality of music data has previously been recorded on the HDD 10 and the foregoing corresponding various data has been stored in the index file.

In the example shown in FIG. 10, the apparatus is in a state where music data A at the top has been moved (status is "mvo") and cannot be reproduced in the music server 50. Subsequent three music data B to D can be read out and reproduced from the HDD 10 (status is "norm"). Music data E at the bottom is data which has been deleted although it had once been registered (status is "dlt") and in which only the index data exists. As mentioned above, in the invention, the index data with respect to the music data deleted from the HDD 10 is also left.

In the embodiment, the index data corresponding to the music data which is being used is preferentially arranged and displayed from the top in the display unit 53. In the embodiment, the music data moved to the apparatus 70 is displayed at the top in the display unit 53 at the highest priority on the basis of the status, namely, "State" of the music data. The reproducible music data read out from the HDD 10 is displayed at the next stage. The data which was deleted from the HDD 10 and in which only the index data exists on the HDD 10 is displayed from the lower position in the display unit 53. The music data having the same status is arranged, for example, on the basis of the description of "Musician". The displaying order of the music data which is displayed in the display unit 53 can be obviously determined by another rule.

First in step S50, a case where it is determined that the processes regarding the recording of the music data from the CD 55 has been selected will be described. Explanation will now be made with respect to the case where the music data read out from the CD 55 at a high speed is recorded to the disk of the HDD 10, namely, the high speed recording is performed. When the high speed recording is set in step S51, the processing routine advances to step S52.

In step S52, a check is made to see if the music data which is recorded on the disk of the HDD 10 is new music data. For example, the music data recorded on the HDD 10 is retrieved and the index data in the index file for the various data corresponding to the index data of the music data to be recorded on the disk of the HDD 10 is retrieved. A check is made to see if the data is any one of (1) data (new data) which does not exist in both the HDD 10 and the index file, (2) data registered in the index file although it does not exist on the HDD 10, and (3) data (existing data) which exists in both the HDD 10 and the index file.

If it is decided in step S52 that the data is the existing data in the case (3), the processing routine advances to step S53 and only "Date" of the index data of the relevant music data in the index file is updated. The updated index data is registered into the index file in step S64. In the case (3), since the high speed recording operation of the music data read out from the CD 55 to the disk of the HDD 10 is not performed, the accounting process shown in FIG. 8 mentioned above is not performed.

If it is determined in step S52 that the new data is recorded in the case (1) or that only the index data exists in the case (2), the processing routine advances to step S54 to record the music data to the HDD 10. The recordable vacant memory capacity of the HDD 10 is examined by the CPU 8 in step S54. The vacant memory capacity necessary for recording can be known from, for example, time information of the music data which is included in the TOC information of the CD 55 and recorded to the disk of the HDD 10.

If it is decided in step S54 that the vacant memory capacity enough to record the music data exists in the HDD 10, the processing routine advances to step S55. The high speed recording of the music data read out from the CD 55 to the disk of the HDD 10 and the accounting process are executed in step S55 in a manner similar to FIG. 8. The index data in the index file is updated and the index data of the music data newly stored on the HDD 10 is registered in step S64.

If it is determined in step S54 that the vacant memory capacity on the HDD 10 is insufficient, step S56 follows. The music data which can be deleted is retrieved and the retrieved music data is deleted from the HDD 10 in steps S56 and S57. The deletion of the data from the HDD 10 is repeated until the vacant capacity in which the music data to be recorded can be recorded is assured on the HDD 10. The music data to be deleted can be selected by the user every time or can be deleted in accordance with the order from the old music data in the music data stored on the HDD 10.

As music data which can be deleted, for example, a reproducing frequency of the music data can be counted and the data of a low reproducing frequency can be selected. A mark indicative of the music data which can be deleted is added to the status "State" and the music data with the marks can be deleted in accordance with the order from the old data. For example, it is also possible to construct such that the unnecessary music data is automatically or manually saved to another memory area on the HDD 10 and the music data is deleted in accordance with the order from the music data saved in the other memory area.

In step S64, if the index data regarding the relevant music data has already been registered (the case of (2)), the relevant index data is updated. For example, when the music data E which has once been deleted is recorded again in the example shown in FIG. 10, as shown in an example in FIG. 12, the status "State" of the music data E is changed from "dlt" to "norm" and the date "Date" is changed. At the same time, the displaying order of the music data E is changed.

When the music data is newly recorded as in the case of (1), on the other hand, new index data is formed. As shown in an example in FIG. 13, music data F is inserted into the existing index data.

According to the invention as mentioned above, the discrimination upon recording of the music data is performed on the basis of the index data. Therefore, a situation such that the double charge is performed for the same music data or the same music data is stored twice onto the HDD 10 can be prevented.

Although the high speed recording from the CD 55 has been described, even in case of reading out the data from the CD 55 at the specified transfer speed and storing it onto the HDD 10, the accounting process is not performed in step S55 and the other processes are executed in a manner similar to those mentioned above.

The case where the move of the music data is selected in step S50 will now be described. When the move of the music data is instructed in step S58, the move is discriminated in next step S59. That is, whether it is the move (OUT in step S59 in FIG. 11) from the music server 50 to another electronic equipment such as a portable recording and reproducing apparatus 70 or the move (IN in step S59 in FIG. 11) from another electronic equipment to the music server 50 is discriminated.

If it is IN or OUT in step S59, the processing routine advances to step S60 and the music data whose move was instructed is compared and collated with the existing index data. In case of the move to the apparatus 70, step S61 follows. In case of the move from another electronic equipment, step S62 follows.

In step S61, the status of the index data is changed from "norm" to "mvo", thereby showing that the music data has been moved. At the same time, the date "Date" of the index data is changed and updated to the date when the move is performed. The relevant music data is read out from the HDD 10 and moved to the partner destination, for example, the portable recording and reproducing apparatus 70, and recorded to the recording medium (HDD 106 in the example) on the partner destination. The processing routine advances to step S64.

In this instance, if information showing the partner destination to which the music data has been moved is described in the item of "Who" of the index data, it is more preferable. If the partner destination is the portable recording and reproducing apparatus 70, the information regarding the item of "Who" can be automatically obtained via the interfaces 34 and 35. As mentioned above, in association with the move of the music data to the apparatus 70, the reproduction inhibition flag is set to the relevant music data on the HDD 10 of the music server 50, thereby inhibiting the reproduction of the moved music data in the server 50.

The index file is updated and the index data is registered in step S64. For example, if the music data D is moved in FIG. 10, as shown in an example in FIG. 14, the order of the music data is replaced and the status "State" is changed from "norm" to "mvo".

The status of the index data is changed from "mvo" to "norm" in step S62. At the same time, the date "Date" of the index data is changed to the date when the move is performed. The relevant music data of the partner destination, for example, the portable recording and reproducing apparatus 70 is erased and deleted from the HDD 10. The reproduction inhibition flag of the music data moved from the apparatus 70 is reset in the music server 50, so that the reproduction can be performed in the server 50.

The index file is updated and the index data is registered in step S64. For example, when the music data A is returned to the music server 50 by the move in FIG. 10, as shown in an example in FIG. 15, the order of the music data is rearranged and the status is changed from "mvo" to "norm".

The music data can be allowed to have a term as an attribute. After the music data having the term was moved from the music server 50, unless the moved music data is returned from the equipment serving as a move destination side to the music server 50 serving as a moving source side until the term, it can be actually erased and deleted from the HDD 10. In this case, for example, it is preferable to display the music data in which the term is pressing or the music data which exceeded the term in the display unit 120 of the apparatus 70 so as to flicker, thereby emphasizing such music data as compared with the other music data and alarming to the user.

In the embodiment as mentioned above, the index data formed by another electronic equipment such as a personal computer can be registered into the index file of the music server 50. That is, when the registration of the index data from another electronic equipment is selected in step S50, the processing routine advances to step S63.

The index data formed by another electronic equipment is supplied via a predetermined interface such as PC card slot 31 or IEEE1394 interface 28 in step S63. The index data formed by another electronic equipment can be supplied through the communication line 61. The supplied index data is added to, for example, the index data existing on the HDD 10. In this instance, it is preferable to construct the data or the like indicative of the status in the index data so as to show that it was supplied from another electronic equipment. For example, consequently, the index data supplied from another electronic equipment can be handled as only the index data in step S52.

Although the index data has been registered in a lump in step S64 as mentioned above, the invention is not limited to such an example. For instance, the index data is updated and also registered in steps S53 and S55, step S63, and step S61 or S62, and step S64 can be omitted.

Although all of the index data has been displayed above by characters, it can be expressed by a figure such as an icon indication. Although the number of index data which can be registered depends on the memory capacity of the HDD 10, for example, 9999 music pieces can be registered into the music server 50.

Further, the index data can be retrieved. There are considered retrieving methods from various fields such as retrieval by a keyword or an initial letter by "Musician", "Music Name", "Album Name", or the like, retrieval by "Music-No.", retrieval by the date by "Date" when the recording is performed, retrieval by "Who" on the data supplying source side, and the like. Those retrieving methods can be performed by a combination. A retrieval in which a range of the term or the like is designated can be performed.

Further, if a large memory capacity of a memory for the index data is assured, head portions each corresponding to, for example, a few seconds of all of the music data registered in the index data are separately recorded, and by reproducing the recorded head portions, the desired music data can be retrieved. When the head portions are recorded, the music data of a few seconds can be further compressed and stored in the memory. The head portions of the actual music data can be sequentially reproduced instead of separately recording the head portions of all of the music data into the memory.

By allowing the music server 50 to have an interface corresponding to the printer, the index data can be printed out. Further, if the index data is constructed so as to have compatibility with, for example, commercially available spreadsheet software or database software which operates on the personal computer, it is preferable because the index data can be managed by the personal computer.

Similarly, the index data can be formed by a personal computer and the formed index data can be used as it is as index data of the music server 50. In this case, the structure itself of the index data doesn't need to have the compatibility with those software. When the index data is outputted from the interface, it can be converted into a format with the compatibility.

The standard of the CD is not limited to the standard to record music data but there is also a standard called, for example, a CD-ROM XA in which program data and text data can be recorded together with the music data. In the CD based on such a CD-ROM XA standard, a method whereby together with the music data, for example, URL on the Internet concerned with the music data is recorded is also considered. Since the WWW browser has been installed in the music server 50 as mentioned above, by reading out the URL information and connecting to the communication line 61, a homepage or the like shown by URL can be displayed on the display unit 53. The URL information can be supplied to the personal computer or the like via, for example, the IEEE1394 interface 28 or PC card slot 31.

According to the invention as described above, the list of music piece information possessed by the user is automatically formed. There is, consequently, an effect that the user can manage, in a lump, the music piece information registered in the music server or the other possessed music piece information.

According to the invention, since the status showing whether the music data has been moved or not, whether the music data is the deleted data or not, or the like is included in the index data, there is an effect that a recording situation of each music data for the music server can be known at a glance.

Further, according to the embodiment, the apparatus has the IEEE1394 interface or PC card and can output and input the index data in a data format having compatibility with, for example, the spreadsheet software, database software, or the like which operates on the personal computer. Thus, there is an effect that the music server and another electronic equipment such as a personal computer or the like are connected and the index data can be more widely used.

Moreover, according to the embodiment, since the internet is connected to perform the accounting process to the music server, there is an effect such that data can be obtained via the internet.

What is claimed is:

1. A recording and reproducing apparatus comprising:

receiving means for receiving supplied data and attribute data relating to said supplied data;

accounting means for charging an amount of money for receiving said supplied data;

memory means for storing said supplied data and said attribute data, wherein said attribute data includes status data;

a recording and reproducing unit for recording said supplied data in said memory means and for reproducing said supplied data recorded in said memory means;

transferring means for transferring said supplied data to an external recording/reproducing apparatus; and control means for attaching a reproduction inhibition flag to said supplied data stored in said memory means when said supplied data is transferred to said external recording/reproducing apparatus, thereby prohibiting reproduction of said transferred data by said recording and reproducing apparatus, and for deleting said reproduction inhibition flag so that the reproduction of said supplied data is enabled when said transferred supplied data is returned to said recording and reproducing apparatus, and for rewriting said status data included in said attribute data of said supplied data stored in said memory means when said supplied data stored in said memory means is deleted from said memory means.

2. The apparatus according to claim 1, wherein when the supplied data stored in said memory means is deleted from said memory means, said control means rewrites the attribute data of the deleted supplied data to attribute data indicating that the deleted supplied data was deleted from said memory means.

3. The apparatus according to claim 1, wherein when the supplied data reproduced from said memory means is supplied to another equipment and stored in the other equipment, said control means rewrites the attribute data of the supplied data stored in said memory means and reproduced from said memory means.

4. The apparatus according to claim 3, wherein when the supplied data reproduced from said memory means is stored in the other equipment, said control means inhibits a reproducing operation in said apparatus of the supplied data reproduced from said memory means and stored in the other equipment.

5. The apparatus according to claim 3, wherein when the supplied data reproduced from said memory means is stored in the other equipment, said control means rewrites a data portion indicative of a storage destination of the supplied data reproduced from said memory means in the attribute data of the supplied data reproduced from said memory means and stored in the other equipment.

6. The apparatus according to claim 1, wherein said control means controls a recording or reproducing operation of said recording and reproducing unit on a basis of the status data.

7. The apparatus according to claim 6, wherein when the supplied data reproduced from said memory means is supplied to another equipment and stored in the other equipment, said control means rewrites the status data of the attribute data of the supplied data reproduced from said memory means.

8. The apparatus according to claim 7, wherein when the status data of the attribute data of the supplied data stored in said memory means indicates that the supplied data obtained by reproducing the supplied data stored in said memory means is the supplied data supplied to the other equipment and stored in the other equipment, said control means inhibits the reproducing operation of said recording and reproducing unit.

9. The apparatus according to claim 1, further comprising a display unit to display the attribute data of the supplied data stored in said memory means.

10. A recording and reproducing apparatus comprising:

receiving means for receiving supplied data and attribute data relating to said supplied data;

accounting means for charging an amount of money for receiving said supplied data;

memory means for storing said supplied data and said attribute data including status data indicative of a status of said supplied data;

a recording and reproducing unit for recording said supplied data into said memory means and for reproducing said supplied data recorded in said memory means;

transferring means for transferring said supplied data to an external recording/reproducing apparatus; and control means for controlling an operation of said recording and reproducing unit on a basis of the status data stored in said memory means and for attaching a reproduction inhibition flag to said supplied data stored in said memory means when said supplied data is transferred to said external recording/reproducing apparatus, thereby prohibiting reproduction of said transferred data by said recording and reproducing apparatus, and for deleting said reproduction inhibition flag so that the reproduction of said supplied data is enabled when said transferred supplied data is returned to said recording and reproducing apparatus, and for rewriting said status data included in said attribute data of said supplied data stored in said memory means when said supplied data stored in said memory means is deleted from said memory means.

11. The apparatus according to claim 10, wherein when the supplied data reproduced from said memory means is supplied to another equipment and stored in the other equipment, said control means rewrites the status data of the attribute data of the supplied data stored in said memory means and reproduced from said memory means.

12. The apparatus according to claim 11, wherein when the supplied data reproduced from said memory means is stored in the other equipment, said control means inhibits a reproducing operation of the supplied data reproduced from said memory means and stored in the other equipment.

13. The apparatus according to claim 11, wherein when the supplied data reproduced from said memory means is stored in the other equipment, said control means rewrites a data portion indicative of a storage destination of the supplied data reproduced from said memory means in the attribute data of the supplied data reproduced from said memory means and stored in the other equipment.

14. The apparatus according to claim 10, further comprising a display unit for displaying the attribute data of the supplied data stored in said memory means.

* * * * *